(12) United States Patent
Xu et al.

(10) Patent No.: US 9,586,819 B2
(45) Date of Patent: Mar. 7, 2017

(54) PROCESS FOR PRODUCING HYDROGEN

(71) Applicant: AIR PRODUCTS AND CHEMICALS, INC., Allentown, PA (US)

(72) Inventors: Jianguo Xu, Wrightstown, PA (US); Xiang-Dong Peng, Orefield, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 14 days.

(21) Appl. No.: 14/713,351

(22) Filed: May 15, 2015

(65) Prior Publication Data
US 2016/0332876 A1 Nov. 17, 2016

(51) Int. Cl.
*C01B 3/48* (2006.01)
*C01B 3/56* (2006.01)
*B01D 53/047* (2006.01)
*B01D 53/26* (2006.01)

(52) U.S. Cl.
CPC .............. *C01B 3/56* (2013.01); *B01D 53/047* (2013.01); *B01D 53/265* (2013.01); *B01D 2256/16* (2013.01); *B01D 2257/502* (2013.01); *B01D 2257/504* (2013.01); *B01D 2257/80* (2013.01); *C01B 2203/042* (2013.01); *C01B 2203/047* (2013.01); *C01B 2203/0475* (2013.01); *C01B 2203/0495* (2013.01)

(58) Field of Classification Search
CPC B01D 53/047; B01D 53/265; B01D 2256/16; B01D 2257/502; B01D 2257/504; B01D 2257/80; C01B 3/48; C01B 3/56; C01B 2203/042; C01B 2203/047; C01B 2203/0475; C01B 2203/0495

USPC .............................................. 95/96; 423/650
See application file for complete search history.

(56) References Cited

U.S. PATENT DOCUMENTS

| | | | |
|---|---|---|---|
| 8,828,107 B2 | 9/2014 | Key et al. | |
| 8,956,587 B1 | 2/2015 | Peng et al. | |
| 2003/0110694 A1* | 6/2003 | Drnevich | ................ C01B 3/384 48/198.5 |
| 2009/0013600 A1* | 1/2009 | Drnevich | ................ C01B 3/382 48/127.7 |

(Continued)

FOREIGN PATENT DOCUMENTS

| | | | |
|---|---|---|---|
| EP | 2865638 A1 | 4/2015 | |
| EP | 2865639 A1 | 4/2015 | |

(Continued)

OTHER PUBLICATIONS

Samaddar, et al., Overcoming high conductivity in process condensate, Johnson Matthey, Reprinted from Petroleum Technology Quarterly, Q1, 2014.

*Primary Examiner* — Frank Lawrence
(74) *Attorney, Agent, or Firm* — Bryan C. Hoke, Jr.

(57) ABSTRACT

Process for producing hydrogen where multiple streams are heated in parallel with reformate that has passed from the shift reactor. Each of the multiple streams are heated from a temperature below the dew point of the reformate to a temperature above the dew point of the reformate by reformate that is cooled from a temperature above the dew point of the reformate to a temperature below the dew point of the reformate. The multiple streams can include two or more of water condensate, boiler feed water, hydrocarbon feedstock, and pressure swing adsorption unit by-product gas.

21 Claims, 4 Drawing Sheets

(56) References Cited

U.S. PATENT DOCUMENTS

| | | | | |
|---|---|---|---|---|
| 2009/0232729 A1* | 9/2009 | Genkin | ............... | C01B 3/384 |
| | | | | 423/651 |
| 2011/0085967 A1 | 4/2011 | Raybold et al. | | |
| 2012/0294783 A1* | 11/2012 | Palamara | ............... | C01B 3/384 |
| | | | | 422/625 |
| 2015/0110708 A1* | 4/2015 | Peng | ............... | C02F 1/16 |
| | | | | 423/580.1 |

FOREIGN PATENT DOCUMENTS

| | | |
|---|---|---|
| WO | 2012078299 A1 | 6/2012 |
| WO | 2014091098 A1 | 6/2014 |

* cited by examiner

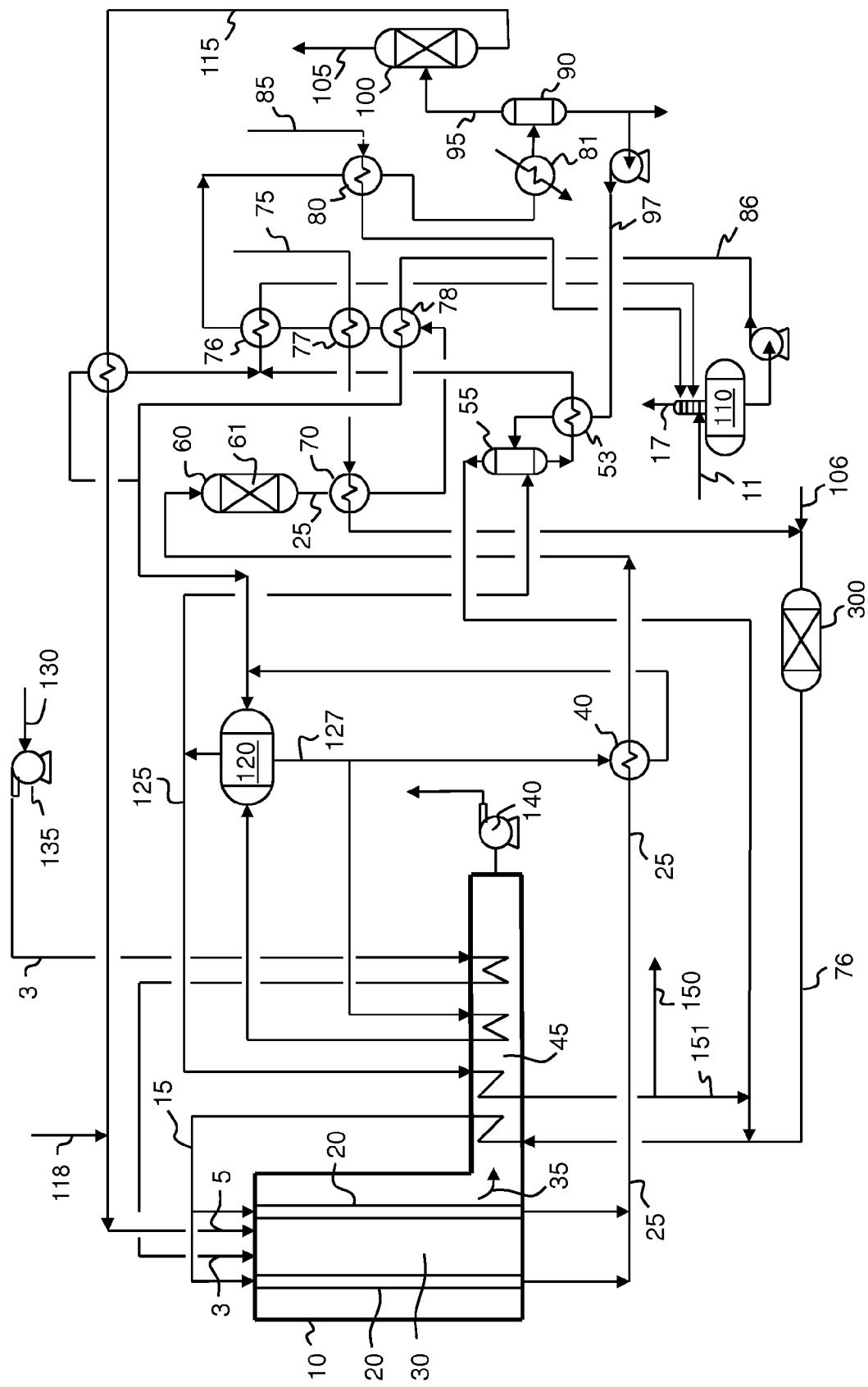
FIG. 3 (comparative case)

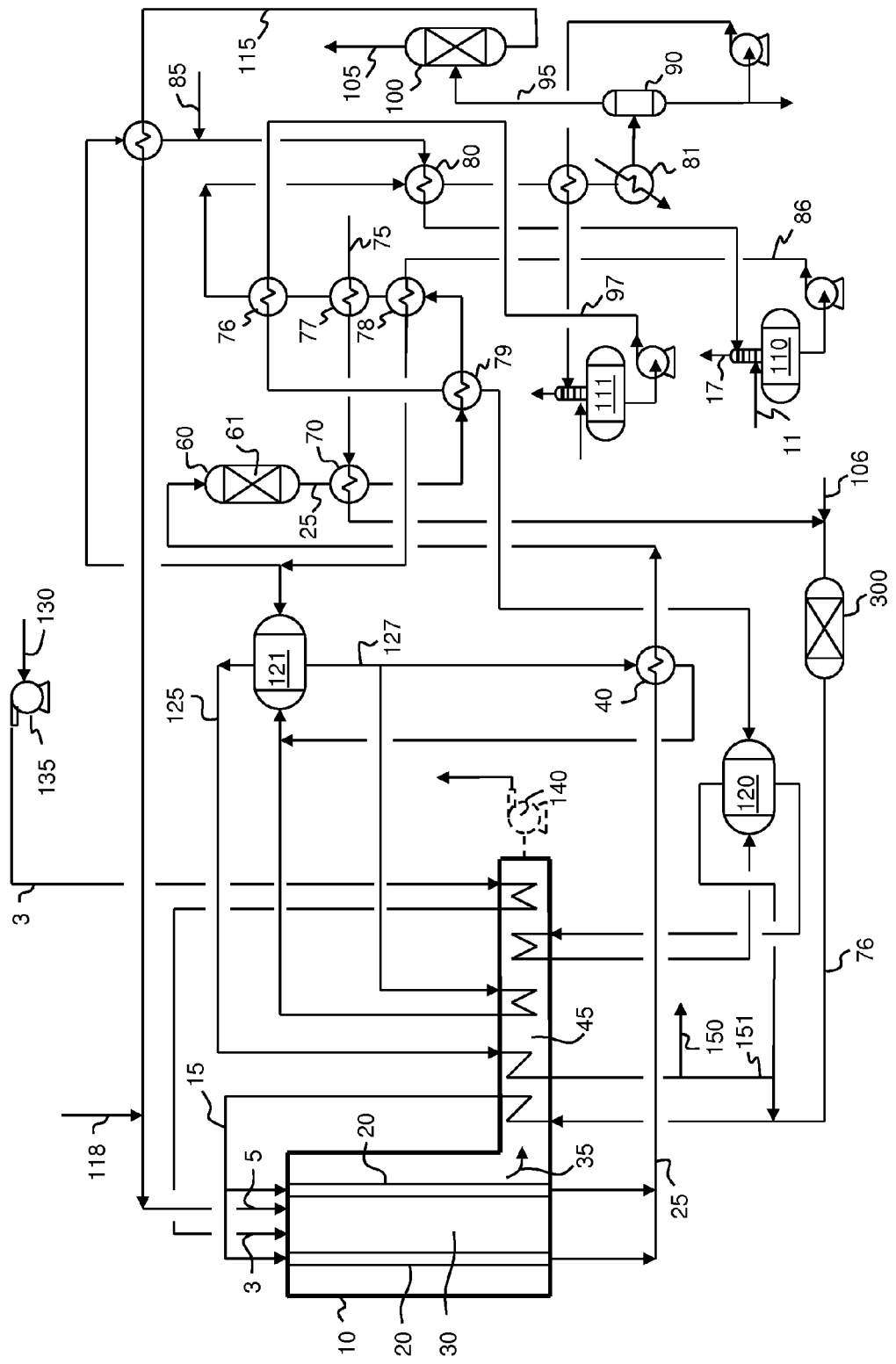
FIG. 4 (comparative case)

PROCESS FOR PRODUCING HYDROGEN

BACKGROUND

Hydrogen production by catalytic steam-hydrocarbon reforming is an energy intensive process. To improve the energy efficiency of the process, reformate formed in the catalytic steam-hydrocarbon reformer is passed through a series of heat exchangers to recover heat. The reformate can be used to heat a variety of streams, for example, boiler feed water, hydrocarbon feedstock, air to the reformer furnace, and fuel to the reformer furnace.

Since the global pinch in the heat exchange network of a catalytic steam-hydrocarbon reforming process is the dew point of the reformate, using heat exchangers in series causes a constraint on efficiently recovering heat from the reformate and may increase equipment cost due to the required size of the heat exchangers.

Industry desires to produce hydrogen with improved energy efficiency.

BRIEF SUMMARY

There are several aspects of the invention as outlined below. In the following, specific aspects of the invention are outlined below. The reference numbers and expressions set in parentheses are referring to an example embodiment explained further below with reference to the figures. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. A process for producing a hydrogen product gas (105), the process comprising:
(a) withdrawing a reformate (25) from a shift reactor (60);
(b) heating a water condensate (97) by indirect heat transfer with the reformate from the shift reactor or a first divided portion thereof, the water condensate (97) heated from a lower temperature, $T_{WC,lower}$, to an upper temperature, $T_{WC,upper}$ when being heated by the reformate or the first divided portion, and the reformate or first divided portion cooled from an upper temperature, $T_{1,upper}$, to a lower temperature, $T_{1,lower}$, when heating the water condensate (97);
(c) heating boiler feed water (86) by indirect heat transfer with the reformate from the shift reactor or a second divided portion thereof, the boiler feed water (86) heated from a lower temperature, $T_{BFW,lower}$, to an upper temperature, $T_{BFW,upper}$ when being heated by the reformate or the second divided portion, and the reformate or second divided portion cooled from an upper temperature, $T_{2,upper}$, to a lower temperature, $T_{2,lower}$, when heating the boiler feed water (86); where
   $T_{WC,lower}$, $T_{BFW,lower}$, $T_{1,lower}$, and $T_{2,lower}$ are less than the dewpoint temperature of the reformate (25) withdrawn from the shift reactor (60); and
   $T_{WC,upper}$, $T_{BFW,upper}$, $T_{1,upper}$, and $T_{2,upper}$ are greater than the dewpoint temperature of the reformate (25) withdrawn from the shift reactor (60);
(d) cooling a mixture comprising at least a portion of the reformate when the reformate heats the water condensate and the boiler feed water or comprising at least a portion of the first divided portion and at least a portion of the second divided portion when the first divided portion heats the water condensate and the second divided portion heats the boiler feed water, the mixture cooled in an amount effective to condense at least a portion of the water in the mixture to form condensed water and a water-depleted reformate gas;
(e) separating the condensed water from the water-depleted reformate gas (formed in step (d)) in a separator (90) thereby forming the water condensate (97) from at least a portion of the condensed water;
(f) passing the water condensate (97) from the separator (90) to a first heat exchange section (56) for the step of heating the water condensate by indirect heat transfer with the reformate or the first divided portion, and passing at least a portion of the water condensate (97) from the first heat exchange section (56) to a steam drum (120), (where the water condensate (97) is passed from the separator (90) to the first heat exchange section (56) prior to being passed from the first heat exchange section (56) to the steam drum (120)); and
(g) separating a pressure swing adsorption unit feed (95) comprising at least a portion of the water-depleted reformate gas in a pressure swing adsorption unit (100) to form the hydrogen product gas (105) and a pressure swing adsorption unit by-product gas (115).

Aspect 2. The process of aspect 1 wherein the water condensate (97) is heated by the first divided portion in the first heat exchange section (56) and the boiler feed water is heated by the second divided portion in a second heat exchange section (58).

Aspect 3. The process of aspect 1 or aspect 2, the process further comprising:
   passing the reformate from the shift reactor (60) to a feedstock-heating heat exchanger (70) to heat a hydrocarbon feedstock (75) by indirect heat transfer with the reformate (25) in the feedstock-heating heat exchanger (70) and withdrawing the reformate from the feedstock-heating heat exchanger (70);
   wherein if the reformate from the shift reactor heats the water condensate in step (b) and the boiler feed water (86) in step (c), the reformate from the shift reactor that heats the water condensate in step (b) and the boiler feed water (86) in step (c) is the reformate withdrawn from the feedstock-heating heat exchanger (70); and
   wherein if the first divided portion of the reformate from the shift reactor heats the water condensate in step (b) and the second divided portion of the reformate from the shift reactor heats the boiler feed water (86) in step (c), the first divided portion of the reformate from the shift reactor is a first divided portion of the reformate withdrawn from the feedstock-heating heat exchanger (70) and the second divided portion of the reformate from the shift reactor is a second divided portion of the reformate withdrawn from the feedstock-heating heat exchanger (70).

Aspect 4. The process of any one of aspects 1 to 3 wherein the water condensate is heated by the first divided portion of the reformate from the shift reactor (60), the process further comprising:
   heating a hydrocarbon feedstock (75) by indirect heat transfer with the first divided portion, the hydrocarbon feedstock (75) heated from a lower temperature, $T_{HF,lower}$, to an upper temperature, $T_{HF,upper}$ when being heated by the first divided portion; where
   $T_{HF,lower}$ is less than the dewpoint temperature of the reformate (25) withdrawn from the shift reactor (60); and $T_{HF,upper}$, is greater than the dewpoint temperature of the reformate (25) withdrawn from the shift reactor (60).

Aspect 5. The process of any one of aspects 1 to 3 wherein the boiler feed water is heated by the second divided portion of the reformate from the shift reactor (60), the process further comprising:

heating a hydrocarbon feedstock (75) by indirect heat transfer with the second divided portion of the reformate from the shift reactor (60), the hydrocarbon feedstock (75) heated from a lower temperature, $T_{HF,lower}$, to an upper temperature, $T_{HF,upper}$ when being heated by the second divided portion; where $T_{HF,lower}$ is less than the dewpoint temperature of the reformate (25) withdrawn from the shift reactor (60); and $T_{HF,upper}$, is greater than the dewpoint temperature of the reformate (25) withdrawn from the shift reactor (60).

Aspect 6. The process of any one of aspects 1 to 3, the process further comprising:

(h) heating a hydrocarbon feedstock (75) by indirect heat transfer with the reformate from the shift reactor (60) or a divided portion of the reformate (25), the hydrocarbon feedstock (75) heated from a lower temperature, $T_{HF,lower}$, to an upper temperature, $T_{HF,upper}$ when being heated by the reformate or the divided portion, and the reformate or divided portion cooled from an upper temperature, $T_{3,upper}$, to a lower temperature, $T_{3,lower}$, when heating the hydrocarbon feedstock (75); where $T_{HF,lower}$ and $T_{3,lower}$ are less than the dewpoint temperature of the reformate (25) withdrawn from the shift reactor (60); and $T_{HF,upper}$ and $T_{3,upper}$ are greater than the dewpoint temperature of the reformate (25) withdrawn from the shift reactor (60); and wherein the mixture comprises at least a portion of the reformate when the reformate also heats the hydrocarbon feedstock or wherein the mixture further comprises at least a portion of the divided portion of the reformate (25) that heats the hydrocarbon feedstock when the divided portion heats the hydrocarbon feedstock.

Aspect 7. The process of aspect 6 wherein the hydrocarbon feedstock (75) is heated by the divided portion in a third heat exchange section (57).

Aspect 8. The process of aspect 6 or aspect 7, the process further comprising:

passing the reformate from the shift reactor (60) to a feedstock-heating heat exchanger (70) to heat the hydrocarbon feedstock (75) by indirect heat transfer with the reformate (25) in the feedstock-heating heat exchanger (70) and withdrawing the reformate from the feedstock-heating heat exchanger (70);

wherein if the reformate from the shift reactor heats the water condensate in step (b), the boiler feed water (86) in step (c), and the hydrocarbon feedstock (75) in step (h), the reformate from the shift reactor that heats the water condensate in step (b), the boiler feed water (86) in step (c), and the hydrocarbon feedstock in step (h) is the reformate withdrawn from the feedstock-heating heat exchanger (70);

wherein if the first divided portion of the reformate from the shift reactor heats the water condensate in step (b), and the second divided portion of the reformate from the shift reactor heats the boiler feed water (86) in step (c), and the divided portion of the reformate from the shift reactor heats the hydrocarbon feedstock in step (h), the first divided portion of the reformate from the shift reactor is a first divided portion of the reformate withdrawn from the feedstock-heating heat exchanger (70), and the second divided portion is a second divided portion of the reformate withdrawn from the feedstock-heating heat exchanger (70), and the divided portion is a divided portion of the reformate withdrawn from the feedstock-heating heat exchanger (70); and wherein the hydrocarbon feedstock (75) is heated in step (h) prior to being heated in the feedstock-heating heat exchanger (70).

Aspect 9. The process of any one of the previous aspects, the process further comprising:

heating the pressure swing adsorption unit by-product gas (115) by indirect heat transfer with a divided portion of the reformate (25) from the shift reactor (60) for heating the pressure swing adsorption unit by-product gas, the pressure swing adsorption unit by-product gas (115) heated from a lower temperature, $T_{PSA,lower}$, to an upper temperature, $T_{PSA,upper}$ when being heated by the divided portion for heating the pressure swing adsorption unit by-product gas, and the divided portion for heating the pressure swing adsorption unit by-product gas cooled from an upper temperature, $T_{4,upper}$, to a lower temperature, $T_{4,lower}$, when heating the pressure swing adsorption unit by-product gas (115); where $T_{PSA,lower}$ and $T_{4,lower}$ are less than the dewpoint temperature of the reformate (25) withdrawn from the shift reactor (60); and $T_{PSA,upper}$ and $T_{4,upper}$ are greater than the dewpoint temperature of the reformate (25) withdrawn from the shift reactor (60);

wherein the mixture further comprises at least a portion of the divided portion of the reformate that heats the pressure swing adsorption unit by-product gas.

Aspect 10. The process of aspect 9 wherein the pressure swing adsorption unit by-product gas (115) is heated by the divided portion that heats the pressure swing adsorption unit by-product gas in a fourth heat exchange section (59).

Aspect 11. The process of aspect 9 or aspect 10, the process further comprising:

passing the reformate (25) from the shift reactor (60) to a feedstock-heating heat exchanger (70), preferably the feedstock-heating heat exchanger (70) of aspect 3 or aspect 8, to heat the hydrocarbon feedstock (75) by indirect heat transfer with the reformate (25) in the feedstock-heating heat exchanger (70) and withdrawing the reformate from the feedstock-heating heat exchanger (70); and wherein the divided portion of the reformate that heats the pressure swing adsorption unit by-product gas is a divided portion of the reformate withdrawn from the feedstock-heating heat exchanger (70) that heats the pressure swing adsorption unit by-product gas.

Aspect 12. The process of any one of aspects 1 to 11 wherein step (f) comprises passing the water condensate (97) from the separator (90) to a deaerator (111), from the deaerator (111) to the first heat exchange section (56), and from the first heat exchange section (56) to the steam drum (120), the process further comprising:

passing the boiler feed water (86) after being heated in step (c) to a second steam drum (121).

Aspect 13. The process of any one of aspects 1 to 11 wherein step (f) comprises passing the water condensate (97) from the first heat exchange section (56) to a steam stripper (55), and from the steam stripper (55) to the steam drum (120), the process further comprising:

passing the boiler feed water (86) after being heated in step (c) to the steam drum (120).

Aspect 14. The process of any one of the preceding aspects wherein the reformate from the shift reactor (60) is divided into the first divided portion and the second divided portion and, optionally, one or more additional divided portions from the shift reactor (60), the first divided portion having a flow rate, the second divided portion having a flow rate, and, if present, the one or more additional divided portions each having a respective flow rate;

the water condensate (97) is heated by the first divided portion in step (b) and the boiler feed water (86) is heated by the second divided portion in step (c); and wherein the flow rate of the first divided portion from the shift reactor (60) and the flow rate of the second divided portion from the shift reactor (60) and, optionally, the flow rates of the one or more additional divided portions are controlled such that $T_{WC,upper}$ and $T_{BFW,upper}$ are greater than the dewpoint temperature of the reformate (25) withdrawn from the shift reactor (60) and $T_{1,lower}$ and $T_{2,lower}$ are less than the dewpoint temperature of the reformate (25) withdrawn from the shift reactor (60).

Aspect 15. The process of the preceding aspect wherein the one or more additional divided portions from the shift reactor (60) include a divided portion for heating a hydrocarbon feedstock (75) and/or a divided portion for heating the pressure swing adsorption unit by-product gas (115), the process further comprising the following steps (k) and/or the following steps (l):

(k) heating a hydrocarbon feedstock (75) by indirect heat transfer with the divided portion for heating a hydrocarbon feedstock (75), the hydrocarbon feedstock (75) heated from a lower temperature, $T_{HF,lower}$, to an upper temperature, $T_{HF,upper}$, when being heated by the divided portion for heating a hydrocarbon feedstock (75), and the divided portion for heating a hydrocarbon feedstock (75) cooled from an upper temperature, $T_{3,upper}$, to a lower temperature, $T_{3,lower}$, when heating the hydrocarbon feedstock (75), where $T_{HF,lower}$ and $T_{3,lower}$ are less than the dewpoint temperature of the reformate (25) withdrawn from the shift reactor (60) and $T_{HF,upper}$ and $T_{3,upper}$ are greater than the dewpoint temperature of the reformate (25) withdrawn from the shift reactor (60), wherein the flow rates of the one or more additional divided portions from the shift reactor (60) are controlled such that $T_{HF,upper}$ is greater than the dewpoint temperature of the reformate (25) withdrawn from the shift reactor (60) and $T_{3,lower}$ is less than the dewpoint temperature of the reformate (25) withdrawn from the shift reactor (60);

(l) heating the pressure swing adsorption unit by-product gas (115) by indirect heat transfer with the divided portion for heating the pressure swing adsorption unit by-product gas (115), the pressure swing adsorption unit by-product gas (115) heated from a lower temperature, $T_{PSA,lower}$, to an upper temperature, $T_{PSA,upper}$, when being heated by the divided portion for heating the pressure swing adsorption unit by-product gas (115), and the divided portion for heating the pressure swing adsorption unit by-product gas (115) cooled from an upper temperature, $T_{4,upper}$, to a lower temperature, $T_{4,lower}$, when heating the pressure swing adsorption unit by-product gas (115), where $T_{PSA,lower}$ and $T_{4,lower}$ are less than the dewpoint temperature of the reformate (25) withdrawn from the shift reactor (60) and $T_{PSA,upper}$ and $T_{4,upper}$ are greater than the dewpoint temperature of the reformate (25) withdrawn from the shift reactor (60), wherein the flow rates of the one or more additional divided portions from the shift reactor (60) are controlled such that $T_{PSA,upper}$ is greater than the dewpoint temperature of the reformate (25) withdrawn from the shift reactor (60) and $T_{4,lower}$ is less than the dewpoint temperature of the reformate (25) withdrawn from the shift reactor (60).

Aspect 16. The process of any one of aspects 1, 3, 6, 8, 9, and 10 wherein the reformate from the shift reactor (60) is conveyed through a common heat exchanger; and wherein the water condensate (97) and the boiler feed water (86) and, optionally, a hydrocarbon feedstock (75) and, optionally, the pressure swing adsorption unit by-product gas (115) are conveyed each in a respective heat exchange structure extending through the reformate from the shift reactor (60) in the common heat exchanger, thereby being heated in parallel indirect heat exchange with the reformate in the common heat exchanger.

Aspect 17. A process for producing a hydrogen product gas (105), the process comprising:

withdrawing a reformate (25) from a shift reactor (60);

heating a water condensate (97) by indirect heat transfer with a first divided portion of the reformate from the shift reactor (60), the water condensate (97) heated from a lower temperature, $T_{WC,lower}$, to an upper temperature, $T_{WC,upper}$ when being heated by the first divided portion, and the first divided portion cooled from an upper temperature, $T_{1,upper}$, to a lower temperature, $T_{1,lower}$, when heating the water condensate (97);

heating boiler feed water (86) by indirect heat transfer with a second divided portion of the reformate from the shift reactor (60), the boiler feed water (86) heated from a lower temperature, $T_{BFW,lower}$, to an upper temperature, $T_{BFW,upper}$ when being heated by the second divided portion, and the second divided portion cooled from an upper temperature, $T_{2,upper}$, to a lower temperature, $T_{2,lower}$, when heating the boiler feed water (86);

heating a hydrocarbon feedstock (75) by indirect heat transfer with a third divided portion of the reformate (25) from the shift reactor (60), the hydrocarbon feedstock (75) heated from a lower temperature, $T_{HF,lower}$, to an upper temperature, $T_{HF,upper}$ when being heated by the third divided portion, and the third divided portion cooled from an upper temperature, $T_{3,upper}$, to a lower temperature, $T_{3,lower}$, when heating the hydrocarbon feedstock (75); where $T_{WC,lower}$, $T_{BFW,lower}$, $T_{HF,lower}$, $T_{1,lower}$, $T_{2,lower}$, and $T_{3,lower}$ are less than the dewpoint temperature of the reformate withdrawn from the shift reactor; and $T_{WC,upper}$, $T_{BFW,upper}$, $T_{HF,upper}$, $T_{1,upper}$, $T_{2,upper}$, and $T_{3,upper}$ are greater than the dewpoint temperature of the reformate withdrawn from the shift reactor;

cooling a mixture comprising at least a portion of the first divided portion, at least a portion of the second divided portion, and at least a portion of the third divided portion, the mixture cooled in an amount effective to condense at least a portion of the water in the mixture to form condensed water and a water-depleted reformate gas;

separating the condensed water from the water-depleted reformate gas in a separator (90) thereby forming the water condensate (97) from at least a portion of the condensed water;

passing the water condensate (97) from the separator (90) to a first heat exchange section (56) for the step of heating the water condensate by indirect heat transfer with the first divided portion, and passing at least a portion of the water condensate (97) from the first heat exchange section (56) to a steam drum (120), where the water condensate (97) is passed from the separator (90) to the first heat exchange section (56) prior to being passed from the first heat exchange section (56) to the steam drum (120); and separating a pressure swing adsorption unit feed (95) comprising at least a portion of the water-depleted reformate gas in a pressure swing adsorption unit (100) to form the hydrogen product gas (105) and a pressure swing adsorption unit by-product gas (115).

Aspect 18. The process of aspect 17 further comprising:

passing the reformate (25) withdrawn from the shift reactor (60) to a feedstock-heating heat exchanger (70) to heat the hydrocarbon feedstock (75) by indirect heat transfer with the reformate (25) in the feedstock-heating heat exchanger (70) and withdrawing the reformate (25) from the feedstock-heating heat exchanger (70); and dividing the reformate from the feedstock-heating heat exchanger (70) to form the first divided portion of the reformate (25) from the shift reactor (60), the second divided portion of the reformate (25) from the shift reactor (60), and the third divided portion of the reformate (25) from the shift reactor (60).

Aspect 19. A process for producing a hydrogen product gas (105), the process comprising:

withdrawing a reformate (25) from a shift reactor (60);

heating a water condensate (97) by indirect heat transfer with a first divided portion of the reformate from the shift reactor (60), the water condensate (97) heated from a lower temperature, $T_{WC,lower}$, to an upper temperature, $T_{WC,upper}$ when being heated by the first divided portion, and the first divided portion cooled from an upper temperature, $T_{1,upper}$, to a lower temperature, $T_{1,lower}$, when heating the water condensate (97);

heating boiler feed water (86) by indirect heat transfer with a second divided portion of the reformate from the shift reactor (60), the boiler feed water (86) heated from a lower temperature, $T_{BFW,lower}$, to an upper temperature, $T_{BFW,upper}$ when being heated by the second divided portion, and the second divided portion cooled from an upper temperature, $T_{2,upper}$, to a lower temperature, $T_{2,lower}$, when heating the boiler feed water (86);

heating a hydrocarbon feedstock (75) by indirect heat transfer with a third divided portion of the reformate (25) from the shift reactor (60), the hydrocarbon feedstock (75) heated from a lower temperature, $T_{HF,lower}$, to an upper temperature, $T_{HF,upper}$ when being heated by the third divided portion, and the third divided portion cooled from an upper temperature, $T_{3,upper}$, to a lower temperature, $T_{3,lower}$, when heating the hydrocarbon feedstock (75);

heating a pressure swing adsorption unit by-product gas (115) by indirect heat transfer with a fourth divided portion of the reformate (25) from the shift reactor (60), the pressure swing adsorption unit by-product gas (115) heated from a lower temperature, $T_{PSA,lower}$, to an upper temperature, $T_{PSA,upper}$ when being heated by the fourth divided portion of the reformate (25), and the fourth divided portion cooled from an upper temperature, $T_{4,upper}$, to a lower temperature, $T_{4,lower}$, when heating the pressure swing adsorption unit by-product gas (115); where $T_{WC,lower}$, $T_{BFW,lower}$, $T_{HF,lower}$, $T_{PSA,lower}$, $T_{1,lower}$, $T_{2,lower}$, $T_{3,lower}$, and $T_{4,lower}$ are less than the dewpoint temperature of the reformate (25) withdrawn from the shift reactor (60); and $T_{WC,upper}$, $T_{BFW,upper}$, $T_{HF,upper}$, $T_{PSA,upper}$, $T_{1,upper}$, $T_{2,upper}$, $T_{3,upper}$, and $T_{4,upper}$ are greater than the dewpoint temperature of the reformate (25) withdrawn from the shift reactor (60);

cooling a mixture comprising at least a portion of the first divided portion, at least a portion of the second divided portion, at least a portion of the third divided portion, and at least a portion of the fourth divided portion, the mixture cooled in an amount effective to condense at least a portion of the water in the mixture to form condensed water and a water-depleted reformate gas;

separating the condensed water from the water-depleted reformate gas in a separator (90) thereby forming the water condensate (97) from at least a portion of the condensed water;

passing the water condensate (97) from the separator (90) to a first heat exchange section (56) for the step of heating the water condensate by indirect heat transfer with the first divided portion, and passing at least a portion of the water condensate (97) from the first heat exchange section (56) to a steam drum (120), where the water condensate (97) is passed from the separator (90) to the first heat exchange section (56) prior to being passed from the first heat exchange section (56) to the steam drum (120); and separating a pressure swing adsorption unit feed (95) comprising at least a portion of the water-depleted reformate gas in a pressure swing adsorption unit (100) to form the hydrogen product gas (105) and the pressure swing adsorption unit by-product gas (115).

Aspect 20. The process of aspect 19 further comprising:

passing the reformate (25) withdrawn from the shift reactor (60) to a feedstock-heating heat exchanger (70) to heat the hydrocarbon feedstock (75) by indirect heat transfer with the reformate (25) in the feedstock-heating heat exchanger (70) and withdrawing the reformate (25) from the feedstock-heating heat exchanger (70); and dividing the reformate (25) from the feedstock-heating heat exchanger (70) to form the first divided portion of the reformate from the shift reactor (60), the second divided portion of the reformate from the shift reactor (60), the third divided portion of the reformate from the shift reactor (60), and the fourth divided portion of the reformate from the shift reactor (60).

BRIEF DESCRIPTION OF SEVERAL VIEWS OF THE DRAWINGS

FIG. 3 is a process flow diagram of a comparative catalytic steam-hydrocarbon reforming process.

FIG. 4 is a process flow diagram of a comparative catalytic steam-hydrocarbon reforming process where two separate steam drums are used.

DETAILED DESCRIPTION OF THE PREFERRED EMBODIMENTS

Figure 1:
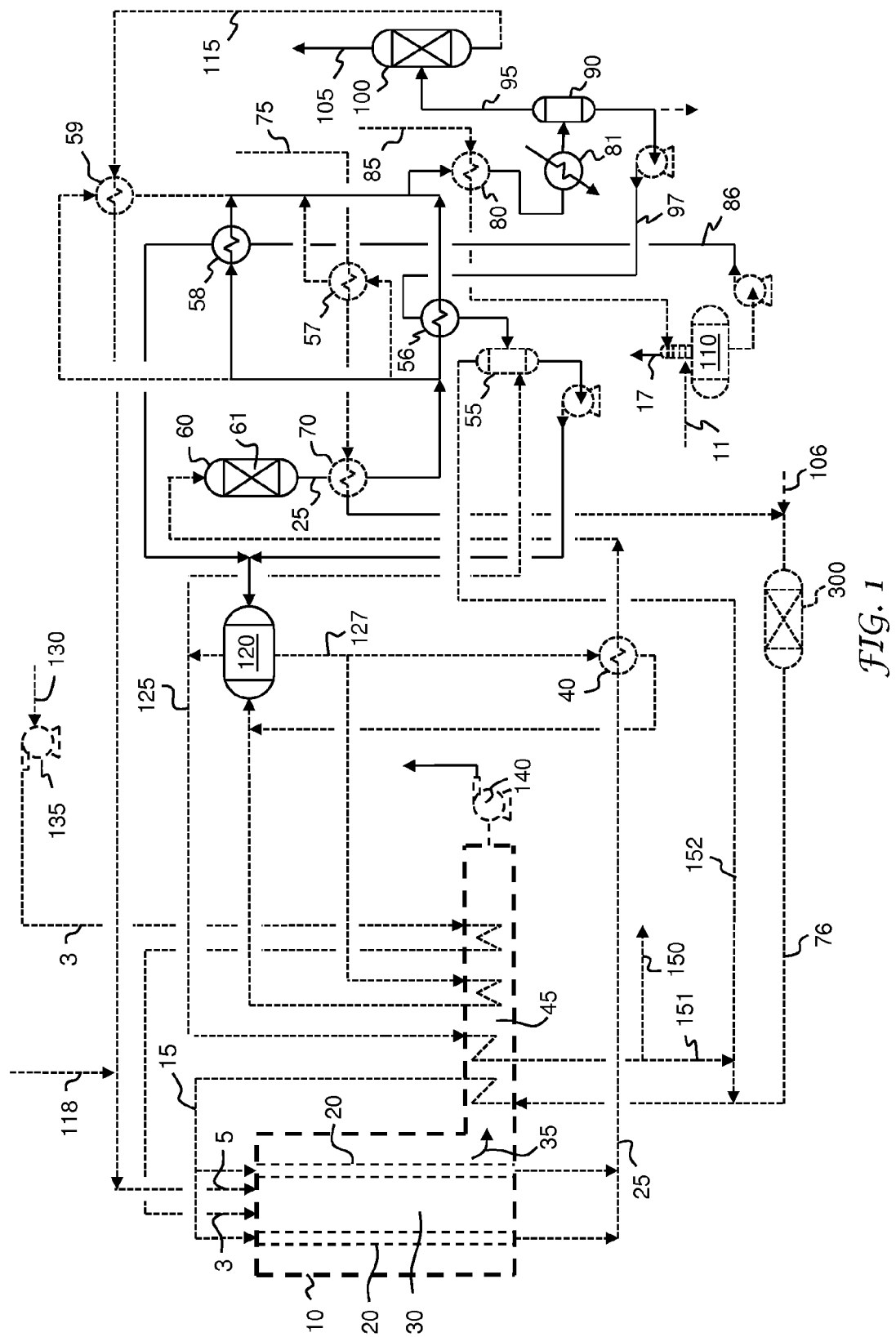
FIG. 1 is a process flow diagram of a catalytic steam-hydrocarbon reforming process.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

The term "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The phrase "at least one of" preceding a list of features or entities means one or more of the features or entities in the list of entities, but not necessarily including at least one of each and every entity specifically listed within the list of entities and not excluding any combinations of entities in the list of entities. For example, "at least one of A, B, or C" (or equivalently "at least one of A, B, and C" or equivalently "at least one of A, B, and/or C") has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The term "plurality" means "two or more than two."

The phrase "at least a portion" means "a portion or all." The at least a portion of a stream may have the same composition with the same concentration of each of the species as the stream from which it is derived. The at least a portion of a stream may have a different concentration of species than that of the stream from which it is derived. The at least a portion of a stream may include only specific species of the stream from which it is derived.

As used herein a "divided portion" of a stream is a portion having the same chemical composition and species concentrations as the stream from which it was taken.

As used herein a "separated portion" of a stream is a portion having a different chemical composition and different species concentrations than the stream from which it was taken.

As used herein, "first," "second," "third," etc. are used to distinguish from among a plurality of steps and/or features, and are not indicative of the total number, or relative position in time and/or space unless expressly stated as such.

In the claims, letters may be used to identify claimed steps (e.g. (a), (b), and (c)). These letters are used to aid in referring to the method steps and are not intended to indicate the order in which claimed steps are performed, unless and only to the extent that such order is specifically recited in the claims.

As used herein, the term "catalyst" refers to a support, catalytic material, and any other additives which may be present on the support.

The term "depleted" means having a lesser mole % concentration of the indicated gas than the original stream from which it was formed. "Depleted" does not mean that the stream is completely lacking the indicated gas.

The terms "rich" or "enriched" means having a greater mole % concentration of the indicated gas than the original stream from which it was formed.

As used herein, "heat" and "heating" may include both sensible and latent heat and heating.

As used herein, "indirect heat transfer" is heat transfer from one stream to another stream where the streams are not mixed together. Indirect heat transfer includes, for example, transfer of heat from a first fluid to a second fluid in a heat exchanger where the fluids are separated by plates or tubes. Indirect heat transfer includes transfer of heat from a first fluid to a second fluid where an intermediate working fluid is used to carry the heat from the first fluid to the second fluid. The first fluid may evaporate a working fluid, e.g. water to steam, in an evaporator, the working fluid passed to another heat exchanger or condenser, where the working fluid transfers heat to the second fluid. Indirect heat transfer from the first fluid to a second fluid using a working fluid may be accommodated using a heat pipe, thermosyphon, kettle boiler, or the like.

As used herein, "direct heat transfer" is heat transfer from one stream to another stream where the streams are intimately mixed together. Direct heat transfer includes, for example, humidification where water is sprayed directly into a hot air stream and the heat from the air evaporates the water.

The present invention relates to a process for producing a hydrogen product gas. The process utilizes catalytic steam-hydrocarbon reforming. Catalytic steam-hydrocarbon reforming, also called steam methane reforming (SMR), catalytic steam reforming, or steam reforming, is defined as any process used to convert reformer feedstock into reformate by reaction with steam over a catalyst. Reformate, also called synthesis gas, or simply syngas, as used herein is any mixture comprising hydrogen and carbon monoxide. The reforming reaction is an endothermic reaction and may be described generally as $C_nH_m + n\ H_2O \rightarrow n\ CO + (m/2+n)\ H_2$. Hydrogen is generated when reformate is generated.

The process is described with reference to the figures each showing process flow diagrams. Like reference numbers refer to like elements throughout the figures. In addition, reference numerals that are introduced in the specification in association with a drawing figure may be repeated in one or more subsequent figures without additional description in the specification in order to provide context for other features.

Figure 2:
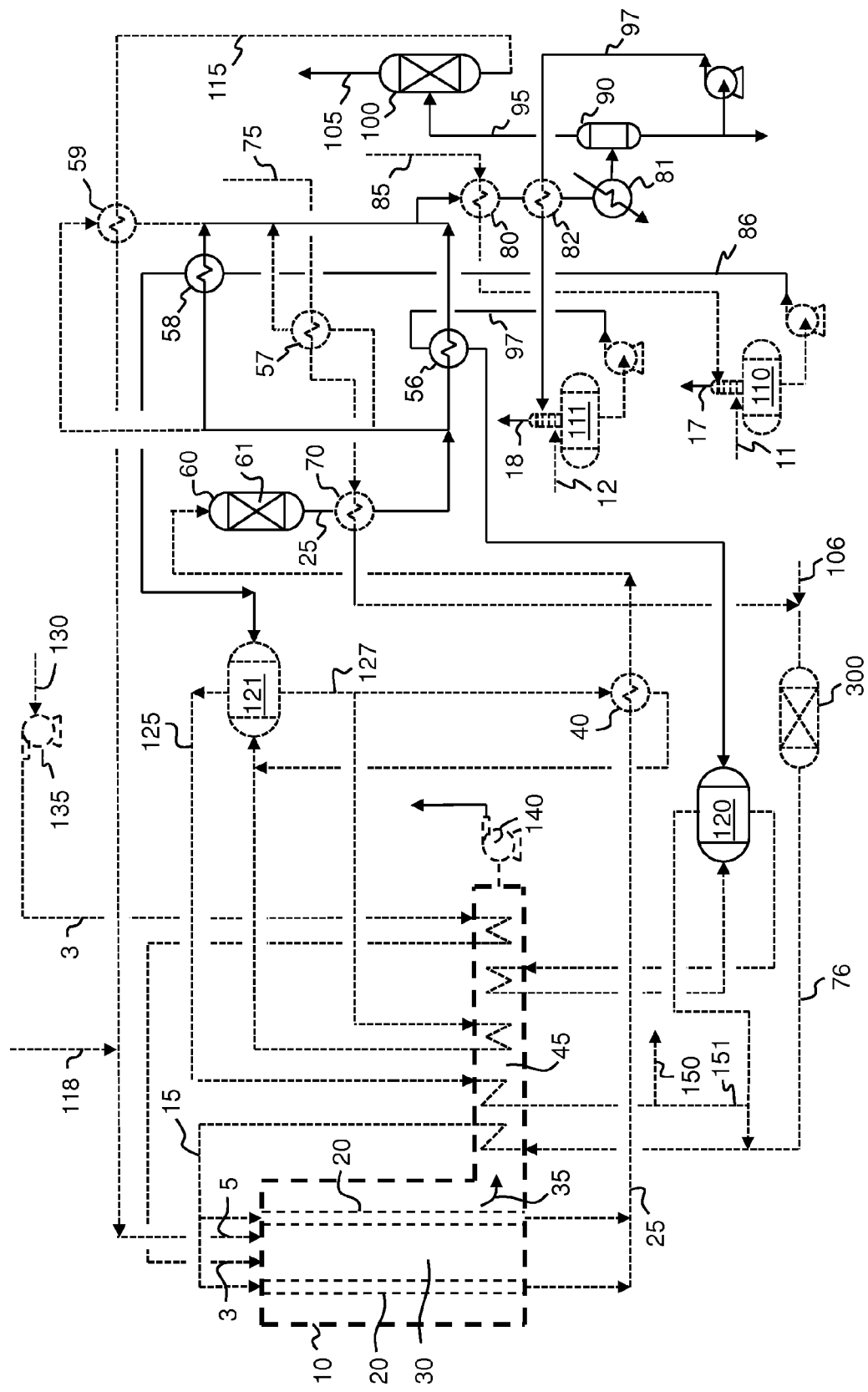
FIG. 2 is a process flow diagram of a catalytic steam-hydrocarbon reforming process where two separate steam drums are used.

Process flow diagrams for a catalytic steam-hydrocarbon reforming processes suitable for carrying out the present process are shown in FIG. 1 and FIG. 2. FIG. 1 shows a process flow diagram having a single steam drum 120, whereas FIG. 2 shows a process flow diagram having two steam drums, 120 and 121. The process flow diagram of FIG. 2 segregates boiler feed water formed from process condensate from boiler feed water formed from make-up water 85. Process condensate may contain organic compounds. The advantage of using a separate steam drum for the process condensate and a separate steam drum for boiler feed water formed from make-up water is to prevent the organic compounds from getting into the export steam 150. Steam formed from the process condensate may be used to form feed gas mixture 15 where the presence of the organic compounds can be easily tolerated.

FIGS. 1 and 2 show required features and optional features, the optional features providing additional context.

In FIG. 1 and FIG. 2, a reformer feed gas mixture 15 is introduced into a plurality of catalyst-containing reformer tubes 20 in a reformer furnace 10, the reformer feed gas mixture 15 is reacted in a reforming reaction under reaction conditions effective to form a reformate 25 comprising $H_2$, CO, $CH_4$, and $H_2O$, and the reformate 25 is withdrawn from the plurality of catalyst-containing tubes 20 of the reformer furnace 10.

The reformer feed gas mixture 15 may be any feed gas mixture suitable for introducing into a catalytic steam-hydrocarbon reformer for forming a reformate. The reformer feed gas mixture 15 may comprise a hydrocarbon feedstock 75 that has been desulphurized and steam 151,152, and/or a mixture of prereformed hydrocarbon feedstock and steam. Hydrocarbon feedstock may be natural gas, methane, naphtha, propane, refinery fuel gas, refinery off-gas, or other suitable reformer feedstock known in the art. Prereformed hydrocarbon feedstock and steam is produced in a prereformer (not shown).

The reforming reaction takes place in the plurality of catalyst-containing reformer tubes 20 in reformer furnace 10. A reformer furnace, also called a catalytic steam reformer, steam methane reformer, and steam-hydrocarbon reformer, is defined herein as any fired furnace used to convert feedstock containing elemental hydrogen and carbon into reformate by a reaction with steam over a catalyst with heat provided by combustion of a fuel.

Reformer furnaces with a plurality of catalyst-containing reformer tubes, i.e. tubular reformers, are well-known in the art. Any suitable number of catalyst-containing reformer tubes may be used. Suitable materials and methods of construction are known. Catalyst in the catalyst-containing reformer tubes may be any suitable catalyst known in the art, for example, a supported catalyst comprising nickel.

The reaction conditions effective to form the reformate 25 in the plurality of catalyst-containing reformer tubes 20 may comprise a temperature ranging from 500° C. to 1000° C. and a pressure ranging from 203 kPa to 5,066 kPa (absolute). The reaction condition temperature may be as measured by any suitable temperature sensor, for example a type J thermocouple. The reaction condition pressure may be as measured by any suitable pressure sensor known in the art, for example a pressure gauge as available from Mensor.

The reformate 25 may exchange heat with a number of streams and may be passed to a shift reactor 60 containing shift catalyst 61. In the exemplary embodiments shown in FIGS. 1 and 2, the reformate 25 withdrawn from the plurality of catalyst-containing reformer tubes 20 is passed to heat exchanger 40 (a so-called waste heat boiler) where the reformate 25 heats a portion of boiler feed water stream 127 thereby forming a two-phase water and steam stream that is reintroduced into steam drum 120 (FIG. 1) or steam drum 121 (FIG. 2).

In the exemplary embodiments shown in FIGS. 1 and 2, reformate 25 is passed from heat exchanger 40 to shift reactor 60. The process may comprise reacting the reformate 25 from heat exchanger 40 in the presence of a shift catalyst 61 under reaction conditions effective to form additional hydrogen in the reformate 25. Additional hydrogen gas may be obtained by the catalytic reaction of carbon monoxide and steam. This reaction is exothermic and is commonly referred to as the water-gas shift reaction or shift reaction: $CO+H_2O \rightarrow CO_2+H_2$. The reaction is affected by passing carbon monoxide and water through a bed of a suitable catalyst. The reaction conditions effective to form additional hydrogen in the reformate 25 may comprise a second temperature ranging from 190° C. to 500° C. and a second pressure ranging from 203 kPa to 5,066 kPa (absolute).

Any suitable shift catalyst may be used. The shift reactor may be a so-called high temperature shift (HTS), low temperature shift (LTS), medium temperature shift (MTS), or combination. One or more shift reactors may be used.

For high temperature shift, an inlet temperature in the range 310° C. to 370° C., and an outlet temperature in the range 400° C. to 500° C. are typical. Usually an iron oxide/chromia catalyst is used for high temperature shift.

For low temperature shift, an inlet temperature in the range 190° C. to 230° C., and an outlet temperature in the range 220° C. to 250° C. are typical. Usually a catalyst comprising metallic copper, zinc oxide, and one or more other difficulty reducible oxides such as alumina or chromia is used for low temperature shift For medium temperature shift, an inlet temperature in the range 190° C. to 230° C. and an outlet temperature of up to 350° C. are typical. A suitably formulated supported copper catalyst can be used for medium temperature shift. Medium temperature shift may be preferred for the exemplary process.

A combination may include a sequence of high temperature shift, cooling by indirect heat exchange, and low temperature shift. If desired, either shift stage can be subdivided with interbed cooling.

As shown in the exemplary embodiments in FIGS. 1 and 2, after passing through the shift reactor 60, the reformate 25 may be passed to optional heat exchanger 70 where hydrocarbon feedstock 75 is heated and reformate 25 is cooled. Since the articles "a" and "the" mean "one or more," heat exchanger 70 may comprise one or more heat exchangers.

The reformate 25 from the shift reactor 60 subsequently heats at least two streams in parallel. The reformate may heat the at least two streams after being cooled in optional heat exchanger 70.

The water condensate 97 and the boiler feed water 86 are heated in parallel by indirect heat transfer with the reformate from the shift reactor (after the reformate is cooled in the heat exchanger 70, if present).

The water condensate 97 and the boiler feed water 86 may be heated in a common heat exchanger (not shown) or the reformate may be divided with a first divided portion heating the water condensate 97 in a first heat exchange section 56 and a second divided portion heating the boiler feed water 86 in a second heat exchange section 58. For the case where a common heat exchanger is used, the common heat exchanger effectively contains both heat exchange section 56 and heat exchange section 58. A common heat exchanger has essentially the same effect as two separate heat exchangers: one heat exchanger containing heat exchange section 56 and a separate heat exchanger containing heat exchange section 58. The common heat exchanger may have separate heat exchange tubes for maintaining separation of the water condensate and the boiler feed water 86 so that the reformate heats the water condensate and the boiler feed water in parallel. In a common heat exchanger the boiler feed water 86 and the water condensate 97 and, optionally, one or more further streams of the process for producing the hydrogen product gas may be conveyed each through a respective heat exchange structure, such as a respective tubing system, extending through the reformate from the shift reactor, thereby heating the boiler feed water 86 and the water condensate 97 and, optionally, the one or more further streams in parallel indirect heat exchange with the reformate. The reformate is conveyed through the common heat exchanger in heat exchange contact with the heat exchange structures.

Each heat exchange structure conveying one of the process streams to be heated through the common heat exchanger is a respective heat exchange section of the common heat exchanger. A heat exchange structure conveying water condensate 97 through the common heat exchanger is a first heat exchange section and a heat exchange structure conveying the boiler feed water 86 through the common heat exchanger is a second heat exchange section of the common heat exchanger. The term "common heat exchanger" is used whenever two or more of the process streams to be heated are conveyed each in a separate heat exchange structure through an undivided stream of reformate from the shift reactor conveyed through that heat exchanger. In a common heat exchanger only the process streams to be heated are separated from one another whereas the reformate is conveyed through the heat exchanger as an undivided reformate stream. For example, the water condensate 97 may be heated in a first heat exchange section 56 and the boiler feed water 86 may be heated in a second heat exchange section 58 of the common heat exchanger whereas one or more further process streams, for example, the hydrocarbon feedstock 75 and/or a pressure swing adsorption unit by-product gas 115 may be heated by indirect heat exchange with a divided portion of the reformate from the shift reactor each in a further heat exchange section external to the common heat exchanger for the water condensate 97 and the heating boiler feed water 86 and in parallel heat exchange to these two process streams.

The water condensate is heated from a lower temperature, $T_{WC,lower}$, to an upper temperature, $T_{WC,upper}$ when being heated by reformate where $T_{WC,lower}$ is less than the dewpoint temperature of the reformate and $T_{WC,upper}$ is greater than the dewpoint temperature of the reformate. In case all of the reformate from the shift reactor heats both the water condensate 97 and the boiler feed water 86, the reformate is cooled from $T_{1,upper}$ to $T_{1,lower}$ when heating the water condensate 97. In case the first divided portion of the reformate heats the water condensate, the first divided portion of the of the reformate is cooled from $T_{1,upper}$ to $T_{1,lower}$ when heating the water condensate 97. $T_{1,upper}$ is greater than the dewpoint temperature of the reformate and $T_{1,lower}$ is less than the dewpoint temperature of the reformate.

The dewpoint temperature or dew point is the temperature at which the water vapor in the reformate will start to condense out of the gaseous phase at the pressure of the reformate in the respective heat exchange process.

For the instance where the reformate is heating the water condensate, the dewpoint temperature is the dewpoint temperature of the reformate at the conditions of the reformate when heating the water condensate. Likewise, the dewpoint temperature of the reformate when heating other streams is the dewpoint temperature of the reformate at the respective conditions of the reformate when heating each respective stream.

The boiler feed water 86 is heated from a lower temperature, $T_{BFW,lower}$, to an upper temperature, $T_{BFW,upper}$ when being heated by reformate 25, where $T_{BFW,lower}$ is less than the dewpoint temperature of the reformate and $T_{BFW,upper}$ is greater than the dewpoint temperature of the reformate. In case all of the reformate from the shift reactor heats both the water condensate 97 and the boiler feed water 86, the reformate is cooled from $T_{2,upper}$ to $T_{2,lower}$ when heating the boiler feed water 86. In case the second divided portion of the reformate heats the boiler feed water 86, the second divided portion of the of the reformate is cooled from $T_{2,upper}$ to $T_{2,lower}$ when heating the boiler feed water 86. $T_{2,upper}$ is greater than the dewpoint temperature of the reformate and $T_{2,lower}$ is less than the dewpoint temperature of the reformate.

The water condensate 97 and the boiler feed water 86 are heated in parallel through the dewpoint temperature of the reformate.

The boiler feed water 86 may be formed by heating a water feed 85 (so-called make-up water) by indirect heat transfer with reformate 25 in heat exchanger 80, thereby cooling the reformate 25 in heat exchanger 80. The water feed 85 may be distilled water, treated water (decalcified, filtered, etc.) or other suitable water known in the art.

After being heated in heat exchanger 80, water feed 85 may be passed to deaerator 110 where dissolved gases are removed. Dissolved gases are stripped from the water feed in the deaerator 110. Steam 11 may be introduced into the deaerator 110 or steam may be formed in-situ by heating or flashing. Steam aids in stripping the dissolved gases. A vent stream 17 is withdrawn from deaerator 110. The vent stream 17 comprises steam and gases formed from the dissolved gases stripped from the water feed 85. Boiler feed water 86 withdrawn from deaerator 110 may be pumped to a higher pressure, heated in heat exchange section 58 by indirect heat transfer with the reformate or second portion of the reformate 25, and passed to steam drum 120.

In case the reformate is divided into the first divided portion and the second divided portion, the flow rates of the first divided portion and the second divided portion may be controlled by one or more valves (not shown). The flow rates may be controlled on any basis, e.g. mass, molar, or volume basis. The flow rates may be controlled so that the outlet temperature of the reformate leaving heat exchange section 56 and the outlet temperature of the reformate leaving heat exchange section 58 are less than the dewpoint temperature of the reformate. The flow rates of the divided portions may be controlled so that the outlet temperatures of the streams being heated are greater than the dewpoint temperature and at their respective design temperatures.

The hydrocarbon feedstock 75 may be heated in a heat exchanger (not shown) by indirect heat transfer with the reformate that heated both the water condensate and the boiler feed water, i.e. in series with the reformate that heated both the water condensate and the boiler feed water. After being heated, the hydrocarbon feedstock may then be passed from this heat exchanger to the heat exchanger 70 for further heating of the hydrocarbon feedstock.

The hydrocarbon feedstock 75 may be heated in a heat exchanger (not shown) by indirect heat transfer with either the first portion of the reformate 25 from heat exchange section 56 or the second portion of the reformate 25 from heat exchange section 58. The feedstock 75 may then be passed from this heat exchanger to the heat exchanger 70 for further heating of the hydrocarbon feedstock.

A mixture comprising the reformate or the first and second portions of the reformate (25), as applicable, is then cooled.

The mixture may be passed to heat exchanger 80 to heat make-up water 85 thereby cooling the mixture.

The mixture is cooled in trim cooler 81 in an amount effective to condense at least a portion of the water in the mixture to form condensed water and a water-depleted reformate gas.

At least a portion of the water-depleted reformate gas is passed as a pressure swing adsorption unit feed 95 to pressure swing adsorption unit 100 and separated therein to form hydrogen product gas 105 and pressure swing adsorption unit by-product gas 115.

The condensed water is separated from the water-depleted reformate gas in separator 90 to form water condensate 97 from at least a portion of the condensed water. A slip stream of condensed water may be removed from the separator, if desired.

Water condensate 97 is passed from separator 90 to heat exchange section 56 and at least a portion of water condensate 97 is passed from heat exchange section 56 to steam drum 120. The water condensate 97 is passed from the separator 90 to the heat exchange section 56 prior to being passed from the heat exchange section 56 to the steam drum 120.

In FIG. 1, water condensate 97 is passed from heat exchange section 56 to steam stripper 55 prior to the water condensate 97 being passed to steam drum 120. Steam from the steam drum 120 or other source is added to steam stripper 55 to strip organic compounds from the condensate. The water condensate 97 portion is passed to steam drum 120. The vapor phase steam component 152 from stripper 55 is blended with desulphurized feedstock 76 and passed as reformer feed gas mixture 15 to the plurality of catalyst-containing tubes 20.

In FIG. 2, water condensate 97 is passed from separator 90 to heat exchanger 82 to be heated by indirect heat exchange with reformate, and then passed to deaerator 111 where dissolved gases are removed. Dissolved gases are stripped from the condensate 97 in deaerator 111. Steam 12 may be introduced into the deaerator 111 or steam may be formed in-situ by heating or flashing. Steam may be provided from steam drum 121 or any other available steam source. Steam aids in stripping the dissolved gases. A vent stream 18 comprises steam and gases formed from the dissolved gases stripped from the condensate 97. Condensate 97 may then be pumped and passed to heat exchange section 56, and then to steam drum 120.

To reduce VOC emissions from the hydrogen production facility, the deaerator vent streams from deaerator 110 and/or deaerator 111 may be injected into the reformer furnace 10 as described in the "Report on Emission Limits for Rule 1189—Emissions from Hydrogen Plant Process Vents," South Coast Air Quality Management District, Jun. 7, 2001 (http//www3.aqmd.gov/hb/attachments/2002/020620b.doc), and "Final Environmental Assessment: Proposed Rule 1189—Emissions from Hydrogen Plant Process Vents" SCAQMD No. 1189JDN021199, South Coast Air Quality Management District Dec. 17, 1999 (http://www.aqmd.gov/docs/default-source/ceqa/documents/aqmd-projects/2000/final-ea-for-proposed-amended-rule-1189.doc?sfvrsn=4).

As shown in FIG. 1, when the water condensate is heated in parallel in heat exchange section 56 and stripped by steam in stripper 55, the water condensate can be pumped and fed directly to a steam drum. A small pump may be capable to provide the pressure head needed to pump the water condensate to a steam drum. The water condensate may be blended with another water stream before introducing the water condensate into the steam drum so that the temperature of the water entering the steam drum is at a desirable level.

As shown in FIG. 1 and FIG. 2, the reformate 25 may heat additional streams in parallel. The reformate may in addition heat the hydrocarbon feedstock 75 and/or the pressure swing adsorption unit by-product gas 115 in parallel with the water condensate 97 and the boiler feed water 86.

The water condensate 97, the boiler feed water 86, and the hydrocarbon feedstock 75 may be heated in a common heat exchanger (not shown) or the reformate may be divided with a divided portion heating the water condensate 97 in heat exchange section 56, another divided portion heating the boiler feed water 86 in heat exchange section 58, and yet another divided portion heating the hydrocarbon feedstock 75 in heat exchange section 57.

In the case where water condensate is heated by the first divided portion of the reformate in the first heat exchange section 56 in a first heat exchanger and the boiler feed water is heated by the second divided portion of the reformate in the second heat exchange section 58 in a second heat exchanger, the hydrocarbon feedstock may be heated in a third heat exchange section where the third heat exchange section 57 is in the same heat exchanger with the first heat exchange section 56 or the same heat exchanger with the second heat exchange section 58.

The hydrocarbon feedstock 75 may be heated from a lower temperature, $T_{HF,lower}$) to an upper temperature, $T_{HF,upper}$ when being heated by reformate, where $T_{HF,lower}$ is less than the dewpoint temperature of the reformate and $T_{HF,upper}$ is greater than the dewpoint temperature of the reformate. In case all of the reformate from the shift reactor heats the water condensate 97, the boiler feed water 86, and the hydrocarbon feedstock 75, the reformate is cooled from $T_{3,upper}$ to $T_{3,lower}$ when heating the hydrocarbon feedstock 75. In case a divided portion of the reformate heats the hydrocarbon feedstock 75, the divided portion of the of the reformate is cooled from $T_{3,upper}$ to $T_{3,lower}$ when heating the hydrocarbon feedstock 75. $T_{3,upper}$ is greater than the dewpoint temperature of the reformate and $T_{3,lower}$ is less than the dewpoint temperature of the reformate.

In case the reformate is divided into the multiple divided portions, the flow rates of the divided portions may be controlled by one or more valves (not shown). For example, the flow rates may be controlled so that the outlet temperature of the reformate leaving heat exchange section 56, the outlet temperature of the reformate leaving heat exchange section 57, and the outlet temperature of the reformate leaving heat exchange section 58 are less than the dewpoint temperature of the reformate. The flow rates of the divided portions may also be controlled so that the outlet temperatures of the stream being heated are greater than the dewpoint temperature and at their respective design temperatures.

For the case where a divided portion heats the hydrocarbon feedstock 75 in heat exchange section 57, the mixture cooled in heat exchanger 80, which comprises the reformate or the portion that heated the condensate and the portion that heated the boiler feed water, may also comprise the divided portion that heats the hydrocarbon feedstock 75.

The pressure swing adsorption unit by-product gas 115 may also be heated by indirect heat transfer with a divided portion of the reformate from the shift reactor 60 (by way of heat exchanger 70, if present). The pressure swing adsorption unit by-product gas 115 may be heated in heat exchange section 59.

The pressure swing adsorption unit by-product gas 115 may be heated from a lower temperature, $T_{PSA,lower}$, to an upper temperature, $T_{PSA,upper}$, when being heated by reformate, where $T_{PSA,lower}$ is less than the dewpoint temperature of the reformate and $T_{PSA,upper}$ is greater than the dewpoint temperature of the reformate. In case all of the reformate from the shift reactor heats the water condensate 97, the boiler feed water 86, and the pressure swing adsorption by-product gas 115, the reformate is cooled from $T_{4,upper}$ to $T_{4,lower}$ when heating the pressure swing adsorption by-product gas 115. In case a divided portion of the reformate heats the pressure swing adsorption by-product gas 115, the divided portion of the of the reformate is cooled from $T_{4,upper}$ to $T_{4,lower}$ when heating the pressure swing adsorption unit by-product gas 115, where $T_{4,upper}$ is greater than the dewpoint temperature of the reformate and $T_{4,lower}$ is less than the dewpoint temperature of the reformate.

In case the reformate is divided into the multiple divided portions, the flow rates of the divided portions may be controlled by one or more valves (not shown). For example, the flow rates may be controlled so that the outlet temperature of the reformate leaving heat exchange section 56, the outlet temperature of the reformate leaving heat exchange section 57, if present, the outlet temperature of the reformate leaving heat exchange section 58, and the outlet temperature of the reformate leaving heat exchange section 59 are less than the dewpoint temperature of the reformate. The flow rates may be controlled so that the outlet temperatures of the streams being heated are greater than the dewpoint temperature and at their respective design temperatures.

For the case where a divided portion heats the pressure swing adsorption unit by-product gas 115 in heat exchange section 59, the mixture cooled in heat exchanger 80, which comprises the reformate or the portion that heated the condensate and the portion that heated the boiler feed water, may also comprise the divided portion that heats the pressure swing adsorption unit by-product gas 115.

As shown in FIG. 1 and FIG. 2, the reformate or a combined stream comprising divided portions of the reformate heats the make-up water 85 in heat exchanger 80. There may be other heat exchangers to heat other streams by the reformate as well, such as a heat exchanger (not shown) to generate low pressure steam for deaerator use, and/or a heat exchanger (not shown) to heat recirculating boiler feed water that is used as a heating medium in the process. All these streams, make-up water plus water condensate in FIG. 2 can be heated in many different ways by the reformate after it has been cooled by heating water condensate 97 in heat exchanger 56, boiler feed water 86, and optionally hydrocarbon feedstock 75, and/or pressure swing adsorption unit by-product 115. For example, they can be heated in series by the reformate or the combined stream of all divided portions of the reformate. Or they can be heated in various serial and/or parallel arrangements by four, three or two reformate streams, depending on the number of divided portions used for heating water condensate 97 in heat exchanger 56 and boiler feed water 86, and, optionally, hydrocarbon feedstock 75 and/or pressure swing adsorption unit by-product 115, and how these divided portions are recombined to form combined reformate streams.

The hydrocarbon feedstock 75 after being heated by indirect heat transfer with at least a portion of the reformate from the shift reactor 60 may be passed to hydrodesulphurization unit 300 to remove sulfur from the hydrocarbon feedstock. As is well-known in the art, sulfur may poison catalyst in the process. Hydrogen 106 for hydrodesulphurization may be added to the feedstock before or after heating the hydrocarbon feedstock 75. Hydrogen product 105 may used to provide hydrogen 106. At least a portion 76 of the desulphurized feedstock may be blended with steam 151, 152 and then further heated by combustion product gas 35 in the convection section 45 of reformer 10 prior to being introduced into the catalyst-containing reformer tubes 20 as reformer feed gas mixture 15.

A fuel 5 may be combusted with an oxidant gas 3 in a combustion section 30 of the reformer furnace 10 external to the plurality of catalyst-containing reformer tubes 20 under conditions effective to combust the fuel 5 to form a combustion product gas 35 comprising $CO_2$ and $H_2O$. Any suitable burner may be used to introduce the fuel 5 and the oxidant gas 3 into the combustion section 30. Combustion of the fuel 5 with the oxidant gas 3 generates heat to supply energy for reacting the reformer feed gas mixture 15 inside the plurality of catalyst-containing reformer tubes 20. The combustion product gas 35 is withdrawn from the combustion section 30 of the reformer furnace 10 and passed to the convection section 45 of the reformer furnace to supply heat to other process streams. The combustion section (also called the radiant, radiation, or radiative section) of the reformer furnace is that part of the reformer furnace containing the plurality of catalyst-containing reformer tubes. The convection section of the reformer furnace is that part of the reformer furnace containing heat exchangers other than the plurality of catalyst-containing reformer tubes. The heat exchangers in the convection section may be for heating process fluids other than reformate, such as water/steam, air, pressure swing adsorption unit by-product gas, reformer feed gas prior to introduction into the catalyst-containing reformer tubes, etc.

Conditions effective to combust the fuel may comprise a temperature ranging from 600° C. to 1500° C. and a pressure ranging from 99 kPa to 101.4 kPa (absolute). The temperature may be as measured by a thermocouple, an optical pyrometer, or any other calibrated temperature measurement device known in the art for measuring furnace temperatures. The pressure may be as measured by any suitable pressure sensor known in the art, for example a pressure gauge as available from Mensor.

The fuel 5 may comprise a by-product gas 115 from a pressure swing adsorber 100 and a supplemental fuel 118. By-product gas from a pressure swing adsorber is often called pressure swing adsorber tail gas, and supplemental fuel is often called trim fuel. The by-product gas 115 and supplemental fuel 118 may be heated before being used as fuel 5. By-product gas 115 and supplemental fuel 118 may be blended and introduced together through a burner to the combustion section, or they may be introduced separately through different ports in the burner. Alternatively, the by-product gas may be introduced through the primary burner and the supplemental fuel may be introduced through lances near the burner.

The oxidant gas 3 is a gas containing oxygen and may be air, oxygen-enriched air, oxygen-depleted air such as gas turbine exhaust, industrial grade oxygen, or any other oxygen-containing gas known for use in a reformer furnace for combustion. For example, as shown in FIGS. 1 and 2, air 130 may be compressed in forced draft fan 135, heated by combustion product gas 35 in the convection section 45, and passed to the reformer furnace as oxidant gas 3.

Combustion product gas 35 may heat a number of different process streams in the convection section 45 of the reformer furnace 10. The combustion product gas 35 may heat the streams in various different configurations (order of heating).

FIG. 1 shows the combustion product gas 35 heating the reformer feed gas mixture 15, followed by superheating the steam 125 from steam drum 120. A portion of the superheated steam may be used to form the reformer feed gas mixture 15 and another portion used to form a steam product 150 (i.e. export steam). After heating the steam, the combustion product gas then heats a portion of boiler feed water 127 from steam drum 120 in a heat exchanger to form a two-phase mixture of steam and water of which at least a portion is returned to the steam drum 120. The combustion product gas then heats the combustion oxidant 3. The combustion product gas 35 may then be passed to an induced draft fan 140 and exhausted.

FIG. 2 shows the combustion product gas 35 heating the reformer feed gas mixture 15, followed by superheating the steam 125 from steam drum 121. A portion of the superheated steam may be used to form the reformer feed gas mixture 15 and another portion used to form a steam product 150 (i.e. export steam). The combustion product gas then heats a portion of boiler feed water 127 from steam drum 121 to form a two-phase mixture of steam and water of which at least a portion is returned to the steam drum 121. After heating boiler feed water from steam drum 121, the combustion product gas heats water condensate from steam drum 120 to form a two-phase mixture of steam and water which is returned to the steam drum 120. The combustion product gas then heats the combustion oxidant 3. The combustion product gas 35 may then be passed to an induced draft fan 140 and exhausted.

EXAMPLES

The examples illustrate the benefits of the heat exchanger networks of the present invention compared to prior art heat exchange networks. Among the benefits of the present process are the reduced thermal energy consumption for hydrogen production, reduced heat exchanger capital cost, and reduced electricity consumption. The thermal energy consumption for hydrogen production can be compared using the net specific energy (NSE) having units $J/Nm^3$, which can be defined $$NSE = \frac{HHV_{fuel} * F_{fuel} + HHV_{feed} * F_{feed} - \Delta H * F_{steam}}{HPR},$$

where
$HHV_{fuel}$ is the higher heating value of the supplemental fuel introduced into the combustion section ($J/Nm^3$),
$F_{fuel}$ is the flow rate of the fuel ($Nm^3/h$),
$HHV_{feed}$ is the higher heating value of the reformer feedstock introduced into the reformer ($J/Nm^3$),
$F_{feed}$ is the flow rate of the reformer feedstock ($Nm^3/h$),
$\Delta H$ is the enthalpy difference between the export steam and water at 25° C. (J/kg),
$F_{steam}$ is the mass flow of the export steam (kg/h), and
HPR is the hydrogen production rate ($Nm^3/h$).

The heat exchanger capital cost can be measured by the sum of the heat exchanger surface area of all heat exchangers (Total Area). The NSE, Total Area and the electricity consumption of all four examples are summarized in Table 1. The NSE, Total Area, and electricity consumption of the two comparative examples are set to 100 to make the comparison on the normalized basis.

Aspen Plus® by Aspen Technology, Inc. was used to simulate the processes described in the examples. Typical conditions for commercial catalytic steam-hydrocarbon reforming are used, such as natural gas feedstock, a steam-to-carbon ratio of 2.7, and a reformate temperature leaving the catalyst-containing tubes of 865° C. Each example includes a high temperature shift reactor and does not include a prereformer. The dew point of the reformate downstream of the high temperature shift reactor is about 175° C.

Example 1

Comparative Case

The heat exchange network for example 1 is shown in FIG. 3. Reformate 25 exits high temperature shift reactor 60 at 417° C. The heat in the reformate is then recovered by heating various streams. First, the reformate is cooled in heat exchanger 70 to 352° C. while heating hydrocarbon feedstock 75 from 147° C. to 371° C. The reformate is then further cooled in boiler feed water heat exchanger 78 to 158° C., in which the reformate reaches its dew point (175° C.) and the steam in the reformate starts to condense. Boiler feed water 86 is heated in heat exchanger 78 from 109° C. to 232° C. The temperature difference in heat exchanger 78 between the hot and cold streams reaches its allowable design minimum (e.g., 11° C.), or pinch, at the dew point of the reformate stream. The reformate then heats feedstock 75 in heat exchanger 77 from 37° C. to 147° C., and the feedstock is then further heated in heat exchanger 70 by the reformate to 371° C.

This example shows that both boiler feed water and hydrocarbon feedstock need to be heated from below the dewpoint temperature of the reformate to above the dewpoint temperature, and this is accomplished by a serial arrangement of boiler feed water heating in heat exchanger 78 sandwiched between hydrocarbon feedstock heating in heat exchangers 70 and 77. It is known that, for the steam reforming process, heat exchange between a hot stream above the dew point of the reformate and a cold stream below the dew point ("cross heat exchanger") will impair thermal efficiency (or increase NSE) and needs to be minimized. In the serial arrangement of example 1, heat exchange between boiler feed water and reformate is carried out efficiently since heat exchanger 78 is pinched at the dew point of the reformate, indicating that "cross heat exchange" is minimized. However, heat exchange between reformate and feedstock in heat exchanger 70 is not efficient because the reformate, which is far above the dew point (e.g., >352° C.), is used to heat feedstock that is far below the dew point (e.g., as low as 147° C.). This cross heat exchange results in greater NSE. And it is obvious that cross heat exchange cannot be avoided in a serial arrangement.

Furthermore, in the heat exchange network of FIG. 3, pressure swing adsorption unit by-product gas 115 is heated from 32° C. to 221° C. by a secondary heat source, hot boiler feed water, which is heated by primary heat sources such as reformate and flue gas. Water condensate 97 is heated and cooled by itself in heat exchanger 53, blended with boiler feed water, heated in heat exchanger 76, passed to deaerator 110, heated in heat exchanger 78 by reformate, and passed to steam drum 120. The "repetitive" heating steps for heating pressure swing adsorption unit by-product gas and water condensate result in not only thermal efficiency loss or greater NSE, but also higher capital cost.

The performance of this comparative heat exchange network is summarized in Table 1 as the basis for comparing to the results for Example 2 which utilizes an improved heat exchanger network according to the present invention.

TABLE 1

Comparison of different heat exchanger networks

|  | Example 1 | Example 2 | Example 3 | Example 4 |
|---|---|---|---|---|
| Net Specific Energy | 100 | 99.4 | 100 | 99.4 |
| Total Area | 100 | 90.2 | 100 | 99.8 |
| Electricity Consumption | 100 | 99.6 | 100 | 95.1 |

Example 2

The heat exchange network for Example 2 is shown in FIG. 1. Optional heat exchangers 57 and 59 are used in this example.

Reformate 25 exits high temperature shift reactor 60 at 417° C. The heat in the reformate is then recovered by heating various streams. First, the reformate is cooled in heat exchanger 70 to 368° C. thereby heating hydrocarbon feedstock 75 from 208° C. to 371° C. The reformate is then divided into four portions. The first divided portion of the reformate is cooled in heat exchanger 56 to 129° C. thereby heating water condensate 97 from 38° C. to 247° C. The second divided portion of the reformate is cooled in heat exchanger 58 to 154° C. thereby heating the boiler feed water 86 from 109° C. to 229° C. The third divided portion of the reformate is cooled in heat exchanger 57 to 58° C. thereby heating hydrocarbon feedstock 75 from 37° C. to 208° C. The fourth divided portion of the reformate is cooled to 104° C. in heat exchanger 59 thereby heating pressure swing adsorption unit by-product gas 115 from 32° C. to 224° C. The divided fractions for the first portion, the second portion, the third portion, and the fourth portion are 0.27, 0.55, 0.07, and 0.11, respectively.

The reformate enters these four heat exchangers above the dew point of the reformate and leaves each heat exchanger below the dew point of the reformate. All four cold streams are heated from below the dew point of the reformate to above the dew point of the reformate. All four heat exchangers are pinched to the design minimums at the dew point of the reformate. These results indicate that the heat exchange between the reformate and the four cold streams are carried out with minimal cross heat exchange or in the most efficient way that can be achieved, thus resulting in 0.6% reduction in NSE compared to the heat exchange network in Example 1, as shown in Table 1. Heating water condensate and pressure swing adsorption unit by-product gas by the primary heat source (reformate) also contributes to the NSE reduction, and results in the 9.8% reduction in Total Area or heat exchanger capital cost as compared to the heat exchange network in Example 1. The electricity consumption is also reduced by 0.4% compared to Example 1, because the pumping associated with repetitive heating of process condensate and pressure swing adsorption unit by-product gas is eliminated.

Example 3

Comparative Case with Dual Stream Drums

The process of this comparative example is shown in FIG. 4. With regard to heat exchange, the main difference between this comparative example and comparative example 1 is that water condensate 97 and make-up boiler feed water 86 are heated separately by reformate 25. Example 3 utilizes multiple stream drums 120 and 121 to segregate boiler feed water containing water condensate from boiler feed water made solely from make up water. The steam made from the make up water is used to make the export steam 150. Reformate 25 leaves high temperature shift reactor 60 at 416° C. and is then used to heat cold streams in series in the following order: hydrocarbon feedstock 75 in heat exchanger 70, water condensate in heat exchanger 79, make-up boiler feed water in heat exchanger 78, hydrocarbon feedstock 75 in heat exchanger 77, and water condensate 97 in heat exchanger 76. Table 2 summarizes the temperatures of the hot and cold streams at the cold and hot ends of each one of these heat exchangers.

TABLE 2

Temperature summary for Example 3

| Heat Exchanger | Hot End Stream | Temp | Cold End Stream | Temp |
|---|---|---|---|---|
| 70 | reformate | 416 | reformate | 352 |
|  | feedstock | 371 | feedstock | 149 |
| 79 | reformate | 352 | reformate | 266 |
|  | water condensate | 242 | water condensate | 154 |
| 78 | reformate | 266 | reformate | 168 |
|  | make-up BFW | 215 | make-up BFW | 109 |
| 77 | reformate | 168 | reformate | 165 |
|  | feedstock | 149 | feedstock | 37 |
| 76 | reformate | 165 | reformate | 159 |
|  | water condensate | 153 | water condensate | 109 |

Similar to the comparative case in Example 1, all four cold streams need to be finally heated to above the dew point of the reformate (175° C.), and this is accomplished by a serial arrangement of heat exchangers. As shown in Table 2, only make-up boiler feed water heat exchanger 78, among all 5 heat exchangers, experiences the dew point of the reformate, indicating efficient heat transfer between reformate and make-up boiler feed water. Substantial cross heat exchange occurs in heat exchangers 70 and 79, resulting in thermal efficiency loss or high NSE. Again, it is obvious that this cross heat exchange is unavoidable for the serial arrangement of heat exchangers. It can be mitigated by using staged heating of feedstock (exchangers 77 and 70) and water condensate (heat exchangers 76 and 79); but staging adds to the heat exchange capital cost or Total Area.

Similar to example 1, pressure swing adsorption unit by-product gas 115 in this example is heated, not by a primary heat source, but by hot boiler feed water from 16° C. to 221° C. This repetitive heating costs both NSE and Total Area.

The performance of this comparative heat exchange network is summarized in Table 1 as the basis for comparing to the results for Example 4 which utilizes an improved heat exchanger network according to the present invention.

Example 4

The heat exchange network of example 4 is shown in FIG. 2. It is very similar to Example 2 since water condensate is already heated there separately from make-up boiler feed water. Reformate 25 leaves high temperature shift reactor 60 at 417° C. The heat in the reformate is then recovered by heating various streams. First, it is cooled in heat exchanger 70 to 368° C. thereby heating feedstock 75 from 222° C. to 371° C. The reformate is then divided into four portions. The first divided portion of the reformate stream is cooled in heat exchanger 56 to 162° C. thereby heating water condensate 97 from 115° C. to 242° C. The second divided portion of the reformate stream is cooled in heat exchanger 58 to 162° C. thereby heating the boiler feed water from 110° C. to 250° C. The third portion of the reformate stream is cooled in heat exchanger 57 to 18° C. thereby heating feedstock 75 from 5° C. to 222° C. The fourth divided portion of the reformate is cooled to 114° C. in heat exchanger 59 thereby heating pressure swing adsorption unit by-product gas 115 from 16° C. to 232° C. The divided fractions for the first portion, the second portion, the third portion, and the fourth portion are 0.36, 0.45, 0.08, and 0.11, respectively.

Similar to Example 2, the heat exchange between the reformate and the four cold streams are carried out in the most efficient way that can be achieved. As shown in Table 1, the benefits of this heat exchange network include 0.6% reduction in NSE, 0.2% reduction in Total Area and 4.9% reduction in electricity consumption compared to the comparative case in Example 3.

We claim:

1. A process for producing a hydrogen product gas, the process comprising:
   (a) withdrawing a reformate from a shift reactor, the reformate comprising $H_2O$, $H_2$, $CO$, and $CO_2$;
   (b) heating a water condensate in a first heat exchange section by indirect heat transfer with the reformate from the shift reactor or a first divided portion thereof, the water condensate heated from a lower temperature, $T_{WC,lower}$, to an upper temperature, $T_{WC,upper}$, when being heated by the reformate or the first divided portion, and the reformate or first divided portion cooled from an upper temperature, $T_{1,upper}$, to a lower temperature, $T_{1,lower}$, when heating the water condensate;
   (c) heating boiler feed water withdrawn from a deaerator in a second heat exchange section by indirect heat transfer with the reformate from the shift reactor or a second divided portion thereof, the boiler feed water heated from a lower temperature, $T_{BFW,lower}$, to an upper temperature, $T_{BFW,upper}$, when being heated by the reformate or the second divided portion, and the reformate or second divided portion cooled from an upper temperature, $T_{2,upper}$, to a lower temperature, $T_{2,lower}$, when heating the boiler feed water; where
   $T_{WC,lower}$, $T_{BFW,lower}$, $T_{1,lower}$, and $T_{2,lower}$ are less than the dewpoint temperature of the reformate withdrawn from the shift reactor; and
   $T_{WC,upper}$, $T_{BFW,upper}$, $T_{1,upper}$, and $T_{2,upper}$ are greater than the dewpoint temperature of the reformate withdrawn from the shift reactor;
   (d) cooling a mixture comprising at least a portion of the reformate when the reformate heats the water condensate and the boiler feed water or comprising at least a portion of the first divided portion and at least a portion of the second divided portion when the first divided portion heats the water condensate and the second divided portion heats the boiler feed water, the mixture cooled in an amount effective to condense at least a portion of the water in the mixture to form condensed water and a water-depleted reformate gas;
   (e) separating the condensed water from the water-depleted reformate gas in a separator thereby forming the water condensate from at least a portion of the condensed water;
   (f) passing the water condensate from the separator to the first heat exchange section for the step of heating the water condensate by indirect heat transfer with the reformate or the first divided portion, and passing at least a portion of the water condensate from the first heat exchange section to a steam drum; and
   (g) separating a pressure swing adsorption unit feed comprising at least a portion of the water-depleted reformate gas in a pressure swing adsorption unit to form the hydrogen product gas and a pressure swing adsorption unit by-product gas.

2. The process of 1 wherein the water condensate is heated by the first divided portion in the first heat exchange section and the boiler feed water is heated by the second divided portion in the second heat exchange section.

3. The process of claim 1, the process further comprising:
   passing the reformate withdrawn from the shift reactor to a feedstock-heating heat exchanger to heat a hydrocarbon feedstock by indirect heat transfer with the reformate in the feedstock-heating heat exchanger and withdrawing the reformate from the feedstock-heating heat exchanger;
   wherein if the reformate from the shift reactor heats the water condensate in step (b) and the boiler feed water in step (c), the reformate from the shift reactor that heats the water condensate in step (b) and the boiler feed water in step (c) is the reformate withdrawn from the feedstock-heating heat exchanger; and
   wherein if the first divided portion of the reformate from the shift reactor heats the water condensate in step (b) and the second divided portion of the reformate from the shift reactor heats the boiler feed water in step (c), the first divided portion of the reformate from the shift reactor is a first divided portion of the reformate withdrawn from the feedstock-heating heat exchanger and the second divided portion of the reformate from the shift reactor is a second divided portion of the reformate withdrawn from the feedstock-heating heat exchanger.

4. The process of claim 1 wherein the water condensate is heated by the first divided portion of the reformate from the shift reactor, the process further comprising:
   heating a hydrocarbon feedstock by indirect heat transfer with the first divided portion, the hydrocarbon feedstock heated from a lower temperature, $T_{HF,lower}$, to an upper temperature, $T_{HF,upper}$ when being heated by the first divided portion; where
   $T_{HF,lower}$ is less than the dewpoint temperature of the reformate withdrawn from the shift reactor; and
   $T_{HF,upper}$ is greater than the dewpoint temperature of the reformate withdrawn from the shift reactor.

5. The process of claim 1 wherein the boiler feed water is heated by the second divided portion of the reformate from the shift reactor, the process further comprising:
   heating a hydrocarbon feedstock by indirect heat transfer with the second divided portion of the reformate from the shift reactor, the hydrocarbon feedstock heated from a lower temperature, $T_{HF,lower}$ to an upper temperature, $T_{HF,upper}$, when being heated by the second divided portion; where
   $T_{HF,lower}$ is less than the dewpoint temperature of the reformate withdrawn from the shift reactor; and
   $T_{HF,upper}$ is greater than the dewpoint temperature of the reformate withdrawn from the shift reactor.

6. The process of claim 1, the process further comprising:
   (h) heating a hydrocarbon feedstock by indirect heat transfer with the reformate from the shift reactor or a divided portion of the reformate, the hydrocarbon feedstock heated from a lower temperature, $T_{HF,lower}$, to an upper temperature, $T_{HF,upper}$, when being heated by the reformate or the divided portion, and the reformate or divided portion cooled from an upper temperature, $T_{3,upper}$, to a lower temperature, $T_{3,lower}$, when heating the hydrocarbon feedstock; where $T_{HF,lower}$ and $T_{3,lower}$ are less than the dewpoint temperature of the reformate withdrawn from the shift reactor; and $T_{HF,upper}$ and $T_{3,upper}$ are greater than the dewpoint temperature of the reformate withdrawn from the shift reactor;

wherein the mixture comprises at least a portion of the reformate when the reformate also heats the hydrocarbon feedstock or wherein the mixture further comprises at least a portion of the divided portion of the reformate that heats the hydrocarbon feedstock when the divided portion heats the hydrocarbon feedstock.

7. The process of claim 6 wherein the hydrocarbon feedstock is heated by the divided portion in a third heat exchange section.

8. The process of claim 6, the process further comprising:
passing the reformate withdrawn from the shift reactor to a feedstock-heating heat exchanger to heat the hydrocarbon feedstock by indirect heat transfer with the reformate in the feedstock-heating heat exchanger and withdrawing the reformate from the feedstock-heating heat exchanger;
wherein if the reformate from the shift reactor heats the water condensate in step (b), the boiler feed water in step (c), and the hydrocarbon feedstock in step (h), the reformate from the shift reactor that heats the water condensate in step (b), the boiler feed water in step (c), and the hydrocarbon feedstock in step (h) is the reformate withdrawn from the feedstock-heating heat exchanger;
wherein if the first divided portion of the reformate from the shift reactor heats the water condensate in step (b), and the second divided portion of the reformate from the shift reactor heats the boiler feed water in step (c), and the divided portion of the reformate from the shift reactor heats the hydrocarbon feedstock in step (h), the first divided portion of the reformate from the shift reactor is a first divided portion of the reformate withdrawn from the feedstock-heating heat exchanger, and the second divided portion is a second divided portion of the reformate withdrawn from the feedstock-heating heat exchanger, and the divided portion is a divided portion of the reformate withdrawn from the feedstock-heating heat exchanger; and
wherein the hydrocarbon feedstock is heated in step (h) prior to being heated in the feedstock-heating heat exchanger.

9. The process of claim 1, the process further comprising:
heating the pressure swing adsorption unit by-product gas by indirect heat transfer with a divided portion of the reformate from the shift reactor for heating the pressure swing adsorption unit by-product gas, the pressure swing adsorption unit by-product gas heated from a lower temperature, $T_{PSA,lower}$, to an upper temperature, $T_{PSA,upper}$ when being heated by the divided portion for heating the pressure swing adsorption unit by-product gas, and the divided portion for heating the pressure swing adsorption unit by-product gas cooled from an upper temperature, $T_{4,upper}$, to a lower temperature, $T_{4,lower}$, when heating the pressure swing adsorption unit by-product gas; where $T_{PSA,lower}$ and $T_{4,lower}$ are less than the dewpoint temperature of the reformate withdrawn from the shift reactor; and $T_{PSA,upper}$ and $T_{4,upper}$ are greater than the dewpoint temperature of the reformate withdrawn from the shift reactor;

wherein the mixture further comprises at least a portion of the divided portion of the reformate that heats the pressure swing adsorption unit by-product gas.

10. The process of claim 9 wherein the pressure swing adsorption unit by-product gas is heated by the divided portion that heats the pressure swing adsorption unit by-product gas in a fourth heat exchange section.

11. The process of claim 9, the process further comprising:
passing the reformate withdrawn from the shift reactor to a feedstock-heating heat exchanger to heat the hydrocarbon feedstock by indirect heat transfer with the reformate in the feedstock-heating heat exchanger and withdrawing the reformate from the feedstock-heating heat exchanger; and
wherein the divided portion of the reformate that heats the pressure swing adsorption unit by-product gas is a divided portion of the reformate withdrawn from the feedstock-heating heat exchanger that heats the pressure swing adsorption unit by-product gas.

12. The process of claim 1 wherein step (f) comprises passing the water condensate from the separator to the deaerator, from the deaerator to the first heat exchange section, and from the first heat exchange section to the steam drum, the process further comprising:
passing the boiler feed water after being heated in step (c) to a second steam drum.

13. The process of claim 1 wherein step (f) comprises passing the water condensate from the first heat exchange section to a steam stripper, and from the steam stripper to the steam drum, the process further comprising:
passing the boiler feed water after being heated in step (c) to the steam drum.

14. The process of claim 1 wherein:
the reformate from the shift reactor is divided into the first divided portion and the second divided portion and, optionally, one or more additional divided portions from the shift reactor, the first divided portion having a flow rate, the second divided portion having a flow rate, and, if present, the one or more additional divided portions each having a respective flow rate;
the water condensate is heated by the first divided portion in step (b) and the boiler feed water is heated by the second divided portion in step (c); and wherein
the flow rate of the first divided portion from the shift reactor and the flow rate of the second divided portion, and optionally, the flow rates of the one or more additional divided portions from the shift reactor are controlled such that $T_{WC,upper}$ and $T_{BFW,upper}$ are greater than the dewpoint temperature of the reformate withdrawn from the shift reactor and $T_{1,lower}$ and $T_{2,lower}$ are less than the dewpoint temperature of the reformate withdrawn from the shift reactor.

15. The process of claim 14 wherein the one or more additional divided portions from the shift reactor include a divided portion for heating a hydrocarbon feedstock, the process further comprising:
heating the hydrocarbon feedstock by indirect heat transfer with the divided portion for heating a hydrocarbon feedstock, the hydrocarbon feedstock heated from a lower temperature, $T_{HF,lower}$, to an upper temperature, $T_{HF,upper}$, when being heated by the divided portion for heating a hydrocarbon feedstock, and the divided portion for heating a hydrocarbon feedstock cooled from an upper temperature, $T_{3,upper}$, to a lower temperature, $T_{3,lower}$, when heating the hydrocarbon feedstock, where $T_{HF,lower}$ and $T_{3,lower}$ are less than the dewpoint temperature of the reformate withdrawn from the shift reactor and $T_{HF,upper}$ and $T_{3,upper}$ are greater than the dewpoint temperature of the reformate withdrawn from the shift reactor, wherein the flow rate of the divided portion for heating the hydrocarbon feedstock is controlled such that $T_{HF,upper}$ is greater than the dewpoint temperature of the reformate withdrawn from the shift reactor and $T_{3,lower}$ is less than the dewpoint temperature of the reformate withdrawn from the shift reactor.

16. The process of claim 14 wherein the one or more additional divided portions from the shift reactor include a divided portion for heating the pressure swing adsorption unit by-product gas, the process further comprising:

heating the pressure swing adsorption unit by-product gas by indirect heat transfer with the divided portion for heating the pressure swing adsorption unit by-product gas, the pressure swing adsorption unit by-product gas heated from a lower temperature, $T_{PSA,lower}$, to an upper temperature, $T_{PSA,upper}$, when being heated by the divided portion for heating the pressure swing adsorption unit by-product gas, and the divided portion for heating the pressure swing adsorption unit by-product gas cooled from an upper temperature, $T_{4,upper}$, to a lower temperature, $T_{4,lower}$, when heating the pressure swing adsorption unit by-product gas, where $T_{PSA,lower}$ and $T_{4,lower}$ are less than the dewpoint temperature of the reformate withdrawn from the shift reactor and $T_{PSA,upper}$ and $T_{4,upper}$ are greater than the dewpoint temperature of the reformate withdrawn from the shift reactor, wherein the flow rate of the divided portion for heating the pressure swing adsorption unit by-product gas is controlled such that $T_{PSA,upper}$ is greater than the dewpoint temperature of the reformate withdrawn from the shift reactor and $T_{4,lower}$ is less than the dewpoint temperature of the reformate withdrawn from the shift reactor.

17. A process for producing a hydrogen product gas, the process comprising:

withdrawing a reformate from a shift reactor;

heating a water condensate by indirect heat transfer with a first divided portion of the reformate from the shift reactor, the water condensate heated from a lower temperature, $T_{WC,lower}$, to an upper temperature, $T_{WC,upper}$ when being heated by the first divided portion, and the first divided portion cooled from an upper temperature, $T_{1,upper}$, to a lower temperature, $T_{1,lower}$, when heating the water condensate;

heating boiler feed water by indirect heat transfer with a second divided portion of the reformate from the shift reactor, the boiler feed water heated from a lower temperature, $T_{BFW,lower}$, to an upper temperature, $T_{BFW,upper}$ when being heated by the second divided portion, and the second divided portion cooled from an upper temperature, $T_{2,upper}$, to a lower temperature, $T_{2,lower}$, when heating the boiler feed water;

heating a hydrocarbon feedstock by indirect heat transfer with a third divided portion of the reformate from the shift reactor, the hydrocarbon feedstock heated from a lower temperature, $T_{HF,lower}$, to an upper temperature, $T_{HF,upper}$ when being heated by the third divided portion, and the third divided portion cooled from an upper temperature, $T_{3,upper}$, to a lower temperature, $T_{3,lower}$, when heating the hydrocarbon feedstock;

where $T_{WC,lower}$, $T_{BFW,lower}$, $T_{HF,lower}$, $T_{1,lower}$, $T_{2,lower}$, and $T_{3,lower}$, are less than the dewpoint temperature of the reformate withdrawn from the shift reactor; and $T_{WC,upper}$, $T_{BFW,upper}$, $T_{HF,upper}$, $T_{1,upper}$, $T_{2,upper}$, and $T_{3,upper}$ are greater than the dewpoint temperature of the reformate withdrawn from the shift reactor;

cooling a mixture comprising at least a portion of the first divided portion, at least a portion of the second divided portion, and at least a portion of the third divided portion, the mixture cooled in an amount effective to condense at least a portion of the water in the mixture to form condensed water and a water-depleted reformate gas;

separating the condensed water from the water-depleted reformate gas in a separator thereby forming the water condensate from at least a portion of the condensed water;

passing the water condensate from the separator to a first heat exchange section for the step of heating the water condensate by indirect heat transfer with the first divided portion, and passing at least a portion of the water condensate from the first heat exchange section to a steam drum, where the water condensate is passed from the separator to the first heat exchange section prior to being passed from the first heat exchange section to the steam drum; and separating a pressure swing adsorption unit feed comprising at least a portion of the water-depleted reformate gas in a pressure swing adsorption unit to form the hydrogen product gas and a pressure swing adsorption unit by-product gas.

18. The process of claim 17 further comprising:

passing the reformate withdrawn from the shift reactor to a feedstock-heating heat exchanger to heat the hydrocarbon feedstock by indirect heat transfer with the reformate in the feedstock-heating heat exchanger and withdrawing the reformate from the feedstock-heating heat exchanger; and dividing the reformate from the feedstock-heating heat exchanger to form the first divided portion of the reformate from the shift reactor, the second divided portion of the reformate from the shift reactor, and the third divided portion of the reformate from the shift reactor.

19. A process for producing a hydrogen product gas, the process comprising:

withdrawing a reformate from a shift reactor;

heating a water condensate by indirect heat transfer with a first divided portion of the reformate from the shift reactor, the water condensate heated from a lower temperature, $T_{WC,lower}$, to an upper temperature, $T_{WC,upper}$ when being heated by the first divided portion, and the first divided portion cooled from an upper temperature, $T_{1,upper}$, to a lower temperature, $T_{1,lower}$, when heating the water condensate;

heating boiler feed water by indirect heat transfer with a second divided portion of the reformate from the shift reactor, the boiler feed water heated from a lower temperature, $T_{BFW,lower}$, to an upper temperature, $T_{BFW,upper}$ when being heated by the second divided portion, and the second divided portion cooled from an upper temperature, $T_{2,upper}$, to a lower temperature, $T_{2,lower}$, when heating the boiler feed water;

heating a hydrocarbon feedstock by indirect heat transfer with a third divided portion of the reformate from the shift reactor, the hydrocarbon feedstock heated from a lower temperature, $T_{HF,lower}$, to an upper temperature, $T_{HF,upper}$ when being heated by the third divided portion, and the third divided portion cooled from an upper temperature, $T_{3,upper}$, to a lower temperature, $T_{3,lower}$, when heating the hydrocarbon feedstock;

heating a pressure swing adsorption unit by-product gas by indirect heat transfer with a fourth divided portion of the reformate from the shift reactor, the pressure swing adsorption unit by-product gas heated from a lower temperature, $T_{PSA,lower}$, to an upper temperature, $T_{PSA,upper}$ when being heated by the fourth divided portion of the reformate, and the fourth divided portion cooled from an upper temperature, $T_{4,upper}$, to a lower temperature, $T_{4,lower}$, when heating the pressure swing adsorption unit by-product gas;

where $T_{WC,lower}$, $T_{BFW,lower}$, $T_{HF,lower}$, $T_{PSA,lower}$, $T_{1,lower}$, $T_{2,lower}$, $T_{3,lower}$, and $T_{4,lower}$ are less than the dewpoint temperature of the reformate withdrawn from the shift reactor; and $T_{WC,upper}$, $T_{BFW,upper}$, $T_{HF,upper}$, $T_{PSA,upper}$, $T_{1,upper}$, $T_{2,upper}$, $T_{3,upper}$, and $T_{4,upper}$ are greater than the dewpoint temperature of the reformate withdrawn from the shift reactor;

cooling a mixture comprising at least a portion of the first divided portion, at least a portion of the second divided portion, at least a portion of the third divided portion, and at least a portion of the fourth divided portion, the mixture cooled in an amount effective to condense at least a portion of the water in the mixture to form condensed water and a water-depleted reformate gas;

separating the condensed water from the water-depleted reformate gas in a separator thereby forming the water condensate from at least a portion of the condensed water;

passing the water condensate from the separator to a first heat exchange section for the step of heating the water condensate by indirect heat transfer with the first divided portion, and passing at least a portion of the water condensate from the first heat exchange section to a steam drum, where the water condensate is passed from the separator to the first heat exchange section prior to being passed from the first heat exchange section to the steam drum; and separating a pressure swing adsorption unit feed comprising at least a portion of the water-depleted reformate gas in a pressure swing adsorption unit to form the hydrogen product gas and a pressure swing adsorption unit by-product gas.

20. The process of claim 19 further comprising:

passing the reformate withdrawn from the shift reactor to a feedstock-heating heat exchanger to heat the hydrocarbon feedstock by indirect heat transfer with the reformate in the feedstock-heating heat exchanger and withdrawing the reformate from the feedstock-heating heat exchanger; and dividing the reformate from the feedstock-heating heat exchanger to form the first divided portion of the reformate from the shift reactor, the second divided portion of the reformate from the shift reactor, the third divided portion of the reformate from the shift reactor, and the fourth divided portion of the reformate from the shift reactor.

21. The process of claim 1 wherein the reformate from the shift reactor is conveyed through a common heat exchanger comprising the first heat exchange section and the second heat exchange section; and wherein the water condensate is conveyed to the first heat exchange section and the boiler feed water is conveyed to the second heat exchange section, thereby being heated in parallel indirect heat exchange with the reformate in the common heat exchanger.

* * * * *